US012485310B2

(12) United States Patent
Rapp et al.

(10) Patent No.: US 12,485,310 B2
(45) Date of Patent: Dec. 2, 2025

(54) SYSTEMS AND METHODS FOR A BALL-THROWING MACHINE PROVIDING LAUNCH WHEEL MOTOR FEEDBACK

(71) Applicant: TOCA Football, Inc., Costa Mesa, CA (US)

(72) Inventors: Wayne Morton Rapp, Irvine, CA (US); Lindon Alford Baker, Yorba Linda, CA (US); Richard Alan Gros, Anaheim Hills, CA (US); Daniel Taylor Murphy, Irvine, CA (US)

(73) Assignee: TOCA Football, Inc., Costa Mesa, CA (US)

( * ) Notice: Subject to any disclaimer, the term of this patent is extended or adjusted under 35 U.S.C. 154(b) by 139 days.

(21) Appl. No.: 18/501,009

(22) Filed: Nov. 2, 2023

(65) Prior Publication Data

US 2024/0149133 A1    May 9, 2024

Related U.S. Application Data

(60) Provisional application No. 63/422,370, filed on Nov. 3, 2022.

(51) Int. Cl.
*A63B 69/40* (2006.01)
*A01K 15/02* (2006.01)
(Continued)

(52) U.S. Cl.
CPC .......... *A63B 24/00* (2013.01); *A63B 24/0075* (2013.01); *A63B 69/40* (2013.01);
(Continued)

(58) Field of Classification Search
CPC ............ A63B 2024/0093; A63B 24/00; A63B 24/0075; A63B 24/0087; A63B 69/40;
(Continued)

(56) References Cited

U.S. PATENT DOCUMENTS

| 4,153,303 A | 5/1979 | Tanner |
| 4,712,534 A | 12/1987 | Nozato |

(Continued)

FOREIGN PATENT DOCUMENTS

WO    2021/051196 A1    3/2021

OTHER PUBLICATIONS

PCT/US2023/078668 filed Nov. 3, 2023 International Search Report and Written Opinion dated Feb. 28, 2024.

(Continued)

*Primary Examiner* — John E Simms, Jr.
(74) *Attorney, Agent, or Firm* — Rutan & Tucker, LLP; Kyle St. James

(57)    ABSTRACT

A ball-throwing machine is disclosed that includes one or more launch wheels configured to impart motion to one or more balls, a wheel motor coupled to each of the one or more launch wheels, a first encoder coupled to a first wheel motor coupled to a first launch wheel, a frame attached to the one or more launch wheels, and a control circuit configured to control the one or more launch wheels. In some instances, the control circuit includes a processor, and non-transitory, computer-readable medium having logic stored thereon, wherein the logic, upon execution by the processor, is configured to cause performance of operations including: receiving wheel motor data from the first encoder, wherein the wheel motor data includes a log of revolutions per minute of the first wheel motor, and detect whether a first ball was launched based on a variation in the wheel motor data.

22 Claims, 20 Drawing Sheets

(51) Int. Cl.
*A63B 24/00* (2006.01)
*A63B 71/06* (2006.01)
*G06N 3/084* (2023.01)

(52) U.S. Cl.
CPC ........ *A63B 69/406* (2013.01); *A63B 71/0619* (2013.01); *G06N 3/084* (2013.01); *A01K 15/021* (2013.01); *A63B 2069/402* (2013.01); *A63B 2071/0683* (2013.01); *A63B 2220/40* (2013.01); *A63B 2220/72* (2013.01); *A63B 2220/808* (2013.01); *A63B 2220/833* (2013.01); *A63B 2225/02* (2013.01); *A63B 2225/20* (2013.01); *A63B 2225/30* (2013.01); *A63B 2225/50* (2013.01); *A63B 2243/0025* (2013.01)

(58) Field of Classification Search
CPC ............ A63B 69/406; A63B 2069/402; A63B 2225/30; A63B 2243/0025; A01K 15/021; A01K 15/025
USPC .......................................................... 124/78
See application file for complete search history.

(56) References Cited

U.S. PATENT DOCUMENTS

| | | | | |
|---|---|---|---|---|
| 8,932,156 B2* | 1/2015 | Boehner | .............. | A63B 69/406 124/78 |
| 9,914,041 B2* | 3/2018 | Vorozilchak | ....... | A63B 69/0026 |
| 2001/0018912 A1* | 9/2001 | Battersby | ............. | A63B 69/406 124/78 |
| 2008/0032828 A1* | 2/2008 | Alger | ................... | A63B 69/002 473/422 |
| 2009/0011872 A1* | 1/2009 | Zhang | .................... | F41B 11/52 473/459 |
| 2011/0056473 A1* | 3/2011 | Bissonnette | ......... | A63B 69/406 124/1 |
| 2013/0104870 A1* | 5/2013 | Rizzo | .................... | A63B 69/38 124/78 |
| 2013/0228138 A1* | 9/2013 | Hamill | ................. | A01K 15/025 124/78 |
| 2014/0121043 A1* | 5/2014 | Blanning | ............... | A63B 69/40 473/459 |
| 2016/0296814 A1* | 10/2016 | Hsu | ....................... | A01K 15/027 |
| 2017/0319930 A1* | 11/2017 | Lewis | .................... | G16H 20/30 |
| 2017/0326428 A1* | 11/2017 | Qian | .................... | A63B 69/406 |
| 2021/0354021 A1* | 11/2021 | Hannallah | ............ | A63B 69/406 |

OTHER PUBLICATIONS

PCT/US2023/078673 filed Nov. 2, 2023 International Search Report and Written Opinion dated Mar. 5, 2023.

W. M. Rapp et al., "Launch Wheel for a Ball-Throwing Machine," filed Nov. 2, 2023, U.S. Appl. No. 18/500,904 including its prosecution history.

W. M. Rapp et al., "System and Method for a Ball-Throwing Machine," filed Nov. 2, 2023, U.S. Appl. No. 18/500,943 including its prosecution history.

W. M. Rapp et al., "Systems and Methods for Determining Ball-Throwing Machine Operability," filed Nov. 2, 2023, U.S. Appl. No. 18/500,995 including its prosecution history.

W. M. Rapp et al., "Systems and Methods for Determining Operability Status of a Ball-Throwing Machine Through MachineLearning Techniques," filed Nov. 2, 2023, U.S. Appl. No. 18/501,005 including its prosecution history.

W. M. Rapp et al., "Systems and Methods for Determining Operability Status of a Ball-Throwing Machine ThroughSignature Analysis," filed Nov. 2, 2023, U.S. Appl. No. 18/501,000 including its prosecution history.

W. M. Rapp et al., "Systems and Methods for Determining Whether a Ball is Present in a Staging Area of a Ball-ThrowingMachine," filed Nov. 2, 2023, U.S. Appl. No. 18/501,006 including its prosecution history.

* cited by examiner

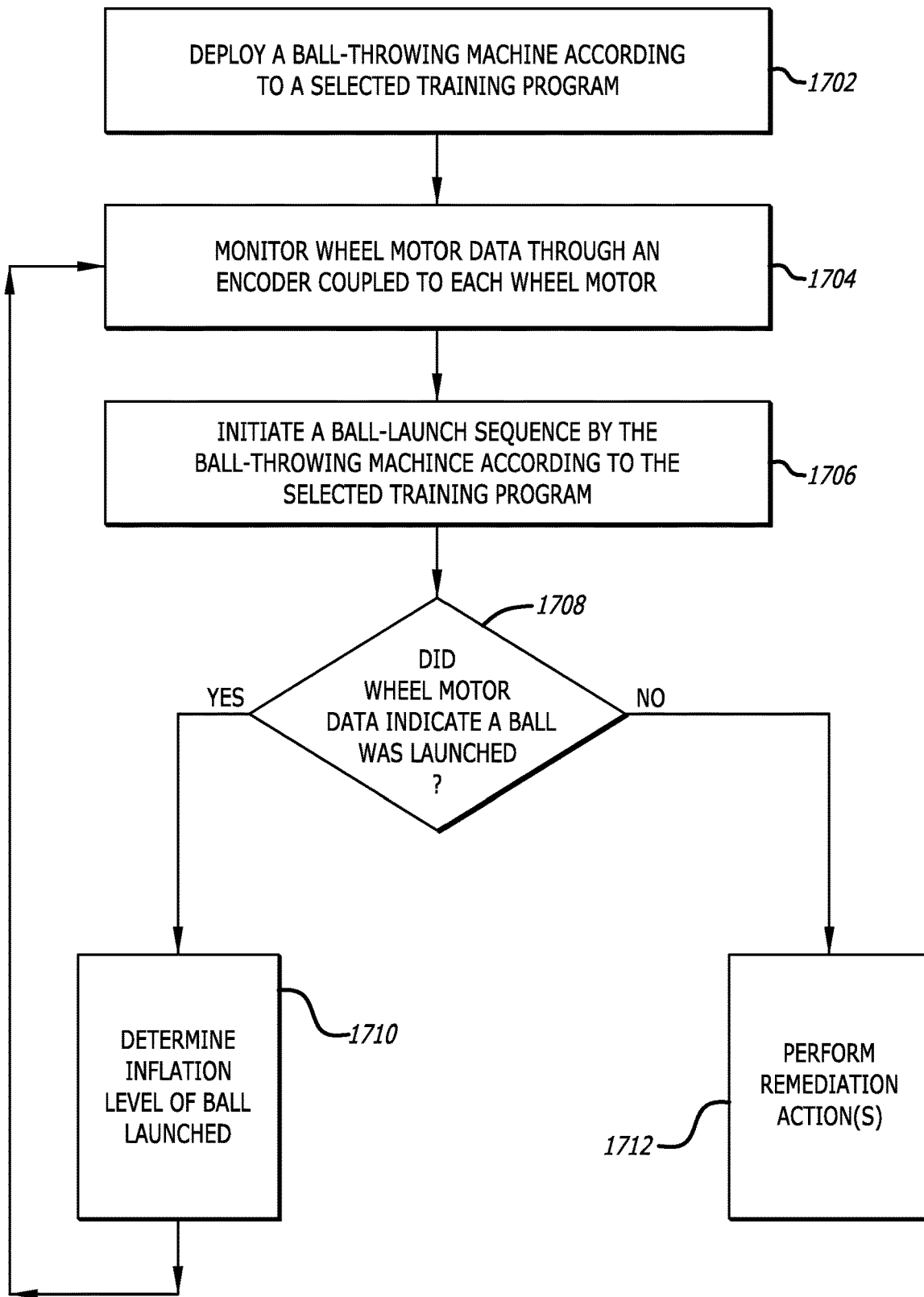

SYSTEMS AND METHODS FOR A BALL-THROWING MACHINE PROVIDING LAUNCH WHEEL MOTOR FEEDBACK

PRIORITY

This application claims priority to U.S. Provisional Patent Application No. 63/422,370, filed Nov. 3, 2022, entitled "MODEL 2100 TOUCH TRAINER," which is incorporated by reference in its entirety into this application.

BACKGROUND

In soccer, to be in control of the ball is of importance to every level of player. The ability to control an awkward bouncing ball quickly and effectively gives the player with the ball the immediate advantage. A first touch of the ball is often the difference between success and failure in most situations during the match. Additionally, accuracy in passing and shooting a ball is essential in developing a well-rounded game. A ball-throwing machine can enhance the speed and efficiency of a training program and therefore, improve a player's ability to perform at a high level at a faster rate. Interruptions of the training program, including loss of operation of the ball-throwing machine, can negatively affect the player's training. As such, improvements in reliability and consistency of the ball-throwing process can benefit the player and the training program.

In some instances, such ball-throwing machines may operate for hours, days, or even months at a time without being checked for operational issues. For example, in a training or social environment, multiple ball-throwing machines may be deployed with tens of people using a single machine on a daily basis. At the end of the environment's operating hours, a person (e.g., trainer or other staff member) may merely plug each ball-throwing machine into an electrical outlet in order to charge a battery of the ball-throwing machine. At the start of the next day, the trainer or other staff member may unplug the ball-throwing machines and initiate each for use with players. This cycle may be repeated for weeks or months.

However, over time, a ball-throwing machine may wear down in certain areas or suffer minor operability issues that are not easily observed by the naked eye. For instance, a trainer or staff member is incapable of observing the slight wear over time of a wheel that operates to launch a ball. Over time, that wearing of one or both of the ball-launching wheels affects the launching of balls and as a result, the training experience. In such instances, balls may not be launched at an accurate speed and/or direction due to the wearing or uneven wearing. In another example, the motor of a ball-throwing machine is critical to its operability; however, a trainer or staff member is incapable of observing the fluctuations in the motor's operability with a naked eye. For instance, the amount of current utilized by the motor fluctuates based on whether the ball-throwing machine is actively launching a ball or is in a "standby" mode (i.e., in between ball launches).

Thus, often times ball-throwing machines go days, weeks, or months without a trainer or other staff member realizing that a ball-throwing machine is not operating properly. Although the ball-throwing machine may be operating sufficiently to launch a series of balls in accordance with a selected training program, the ball-machine may be suffering from operability issues that cause deterioration of the ball-throwing machine and/or a player's experience over time. As today's ball-throwing machines, especially those disclosed herein, are complex, there are many intricate aspects of a ball-throwing machine that may deteriorate but are easily correctable (e.g., replacing worn ball-launching wheels and/or ensuring balls are in the hopper to avoid an attempt to launch a ball without a ball being present, etc.).

Disclosed herein are systems and methods of improving the reliability and consistency of the ball-throwing process of a ball-throwing machine. Additionally, disclosed herein are systems and methods of determining the operability of the ball-throwing machine.

SUMMARY

Disclosed herein is an object-throwing apparatus that, according to some embodiments, includes one or more launch wheels configured to impart motion to one or more objects, a frame attached to the one or more launch wheels, and a control circuit configured to control the one or more launch wheels. The control circuit further includes a processor, a non-transitory computer-readable medium having logic stored thereon, and one or more operational sensors. The processor is configured to execute the logic, which upon execution, causes operations that include (i) launching a series of objects and (ii) obtaining data pertaining to operation of the object-throwing apparatus including a launch of a first object of the series of objects.

In some embodiments, the launching includes rotating the one or more launch wheels to cause delivery of the one or more objects to a player, where the one or more objects may be one or more balls.

In some embodiments, the one or more operational sensors include at least one of an accelerometer or a microphone.

In some embodiments, the operations further include (i) obtaining data from the one or more operational sensors while the ball-throwing machine launches the series of objects in accordance with received instructions and (ii) detecting one or more operational actions based on the data obtained from one or more of the operational sensors.

In some embodiments, the operations further include (i) analyzing the data pertaining to the operation of the object-throwing apparatus and (ii) detecting that the launch of the first object was anomalous through comparison of the data pertaining to the operation of the object-throwing apparatus to a data signature representing an expected set of data corresponding to the launch of the first object.

In some embodiments, the operations further include (i) analyzing the data pertaining to the operation of the object-throwing apparatus, wherein the data pertaining to the operation of the object-throwing apparatus includes at least one of vibration data or sound data, and (ii) detecting that the ball-throwing apparatus is performing anomalously through comparison of the data pertaining to the operation of the object-throwing apparatus to a data signature representing an expected vibration data or sound data.

In some embodiments, the operations further include (i) obtaining vibration data from the one or more operational sensors while the ball-throwing machine launches the series of objects in accordance with received instructions and (ii) performing an analysis on the vibration data obtained from the one or more operational sensors, where performing an analysis including comparing a subset of the vibration data corresponding to a known point in time during launching of the series of objects to expected vibration data, and where the known point in time corresponds to an expected launch of a first object by the ball-throwing machine.

In some embodiments, wherein the operations further include (i) obtaining sound data from a microphone while the ball-throwing machine launches the series of objects in accordance with received instructions, where the microphone is included in the one or more operational sensors; and (ii) performing an analysis on the sound data. Performing the analysis includes comparing (i) a subset of the sound data corresponding to a known point in time at which the first object was launched to (ii) expected sound data for an object launch. Performing the analysis further includes determining that the launch of the first ball was anomalous and generating an alert indicating that the launch of the first ball was anomalous. In some embodiments, the alert is recorded in a data log.

In some embodiments, the control circuit is configured to receive instructions to launch the series of objects, where the instructions indicate a number of objects to be launched and at least a speed and trajectory for each of the objects to be launched.

Also disclosed herein is a computerized method that, according to some embodiments, includes (i) receiving instructions to launch a series of objects from a ball-throwing machine that includes a set of launch wheels configured to launch the series of objects, a motor to drive the launch wheels, and one or more operational sensors; (ii) obtaining data from the one or more operational sensors while the ball-throwing machine launches the series of objects in accordance with the received instructions; and (iii) detecting one or more operational actions based on the data obtained from one or more of the operational sensors.

In some embodiments of the computerized method, launching the series of objects includes rotating the one or more launch wheels to cause delivery of the one or more objects to a player, where the one or more objects may include one or more balls.

In some embodiments of the computerized method, the one or more operational sensors include at least one of an accelerometer or a microphone.

In some embodiments, the computerized method further includes (i) obtaining data from the one or more operational sensors while the ball-throwing machine launches the series of objects in accordance with received instructions and (ii) detecting one or more operational actions based on the data obtained from one or more of the operational sensors.

In some embodiments, the computerized method further includes (i) analyzing the data pertaining to the operation of the object-throwing apparatus and (ii) detecting that the launch of the first object was anomalous through comparison of the data pertaining to the operation of the object-throwing apparatus to a data signature, where the data signature represents an expected set of data corresponding to the launch of the first object.

In some embodiments, the computerized method further includes (i) analyzing the data pertaining to the operation of the object-throwing apparatus, where the data pertaining to the operation of the object-throwing apparatus includes at least one of vibration data or sound data; and (ii) detecting that the ball-throwing apparatus is performing anomalously through comparison of the data pertaining to the operation of the object-throwing apparatus to a data signature representing an expected vibration data or sound data.

In some embodiments, the computerized method further includes (i) obtaining vibration data from the one or more operational sensors while the ball-throwing machine launches the series of objects in accordance with received instructions and (ii) performing an analysis on the vibration data obtained from the one or more operational sensors. Performing the analysis may include comparing a subset of the vibration data corresponding to a known point in time during launching of the series of objects to expected vibration data, where the known point in time corresponds to an expected launch of a first object by the ball-throwing machine.

In some embodiments, the computerized method further includes (i) obtaining sound data from a microphone while the ball-throwing machine launches the series of objects in accordance with received instructions, wherein the microphone is included in the one or more operational sensors and (ii) performing an analysis on the sound data, where performing the analysis includes comparing (i) a subset of the sound data corresponding to a known point in time at which the first object was launched to (ii) expected sound data for an object launch. In such embodiments, the computerized method may further include determining that the launch of the first ball was anomalous and generating an alert indicating that the launch of the first ball was anomalous. In some embodiments of the computerized method the alert is recorded in a data log.

In some embodiments of the computerized method, a control circuit of the ball-throwing machine is configured to receive instructions to launch the series of objects, where the instructions indicate a number of objects to be launched and at least a speed and a trajectory for each of the objects to be launched.

These and other features of the concepts provided herein will become more apparent to those of skill in the art in view of the accompanying drawings and following description, which describe particular embodiments of such concepts in greater detail.

BRIEF DESCRIPTION OF THE DRAWINGS

Embodiments of the invention are illustrated by way of example and not by way of limitation in the figures of the accompanying drawings, in which like references indicate similar elements and in which:

FIG. 17 is a flow diagram illustrating operations of a method for monitoring wheel motor data to detect a ball launch during deployment of a ball-throwing machine in accordance with some embodiments.

DETAILED DESCRIPTION

Figure 1:
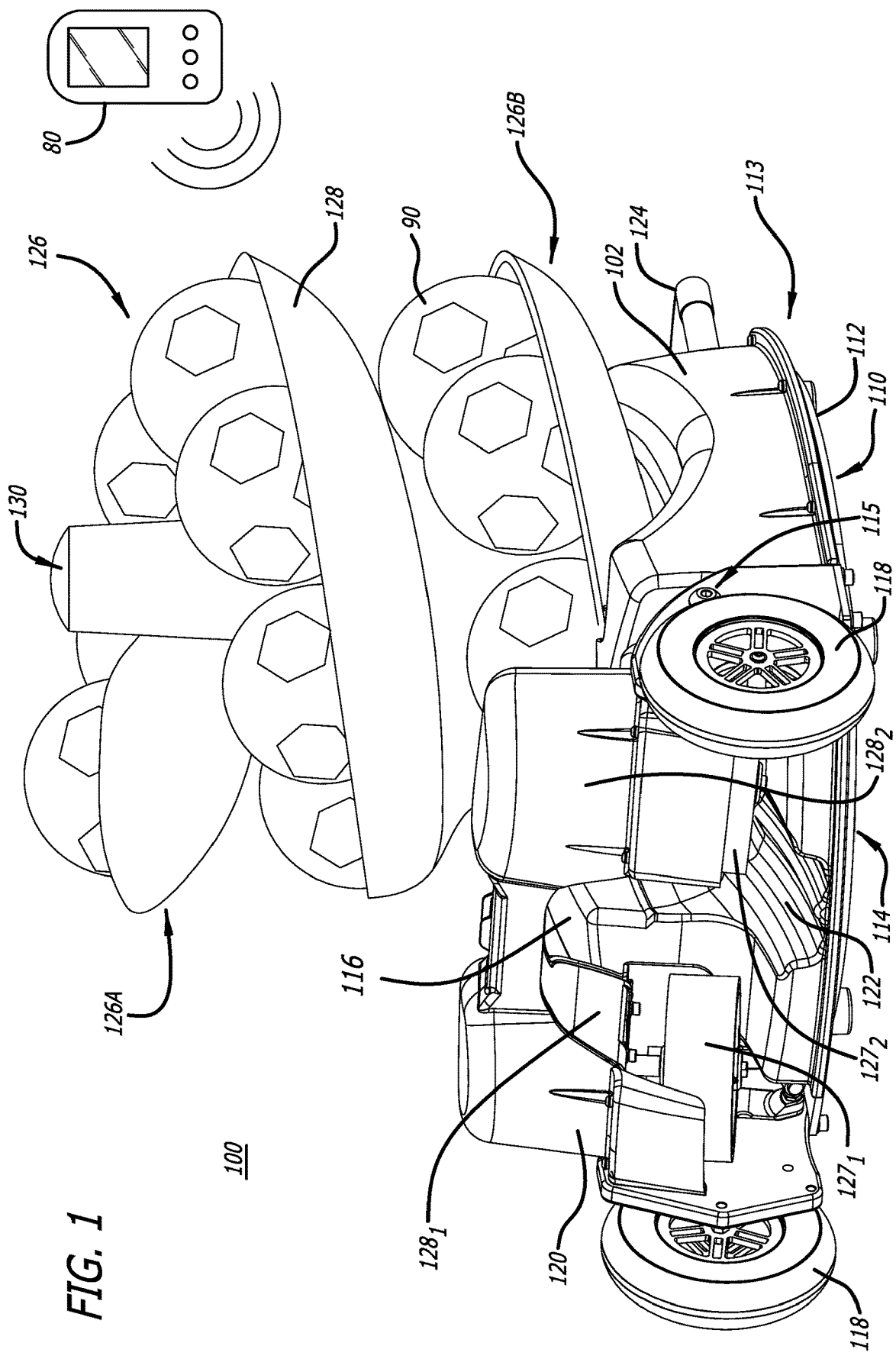
FIG. 1 is a perspective front view illustration of a ball-throwing machine according to some embodiments.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

The phrases "connected to," "coupled with," and "in communication with" refer to any form of interaction between two or more entities, including but not limited to mechanical, electrical, magnetic, electromagnetic, fluid, and thermal interaction. Two components may be coupled with each other even though they are not in direct contact with each other. For example, two components may be coupled with each other through an intermediate component.

The term "logic" may be representative of hardware, firmware or software that is configured to perform one or more functions. As hardware, the term logic may refer to or include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the term logic may refer to or include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic may be stored in persistent storage.

Unless defined otherwise, all technical and scientific terms used herein have the same meaning as commonly understood by those of ordinary skill in the art. As used herein, the word "trajectory" includes the initial path of an object upon launch, where the initial path includes a launch angle with respect to the ground and a lateral or side-by-side direction.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified. Moreover, sub-routines or only a portion of a method described herein may be a separate method within the scope of this disclosure. Stated otherwise, some methods may include only a portion of the steps described in a more detailed method. Additionally, all embodiments disclosed herein are combinable and/or interchangeable unless stated otherwise or such combination or interchange would be contrary to the stated operability of either embodiment.

A soccer player's first touch of the ball is an important core skill to develop. A touch can be as simple as receiving a slow pass on the ground or as difficult as taking a top speed knuckling ball out of the air and straight down onto one's foot. First touch development is a continual process; youth and professionals alike perpetually train to ever improve their first touch and ball handling skills. The skill of touch is typically trained by players forming pairs and passing the ball to one another. This training method can produce results but tends to fall short in providing a disciplined approach to training that enables progress measurement and goal-oriented improvement. Further, this technique requires a player to find another individual with which to practice, which is not always practical, particularly for serious athletes who devote significant time to their training.

This disclosure describes a specialized ball-throwing machine that can be used to improve a player's first touch and ball control, among other benefits. The ball-throwing machine can be designed to throw, lob, pitch, or otherwise eject soccer balls toward a player, who can trap the balls or practice other ball control skills. The ball-throwing machine may be controlled using a controller in the form of a handheld computing device or the like. The game of soccer is commonly known in some countries as "football" or "association football." For convenience, this specification refers solely to the term "soccer," although such usage should be considered synonymous with "football" and "association football." Further, embodiments of the ball-throwing machine, controller, and soccer network application described herein can be used or adapted for sports other than soccer, some examples of which are described below.

It should also be noted that although this specification refers primarily to using a ball-throwing machine to train ball trapping skills, the ball-throwing machine can be used to train other skills. For example, the ball-throwing machine can be used to train passing, shooting, and stopping a soccer ball, among other ball skills. Note that further details regarding the ball-throwing machine can be found in U.S. Pat. Nos. 9,010,309, 9,555,306 and 10,252,128, and 10,118,078 each of which is incorporated by reference in its entirety into this application.

I. Ball-Throwing Machine

Figure 2:
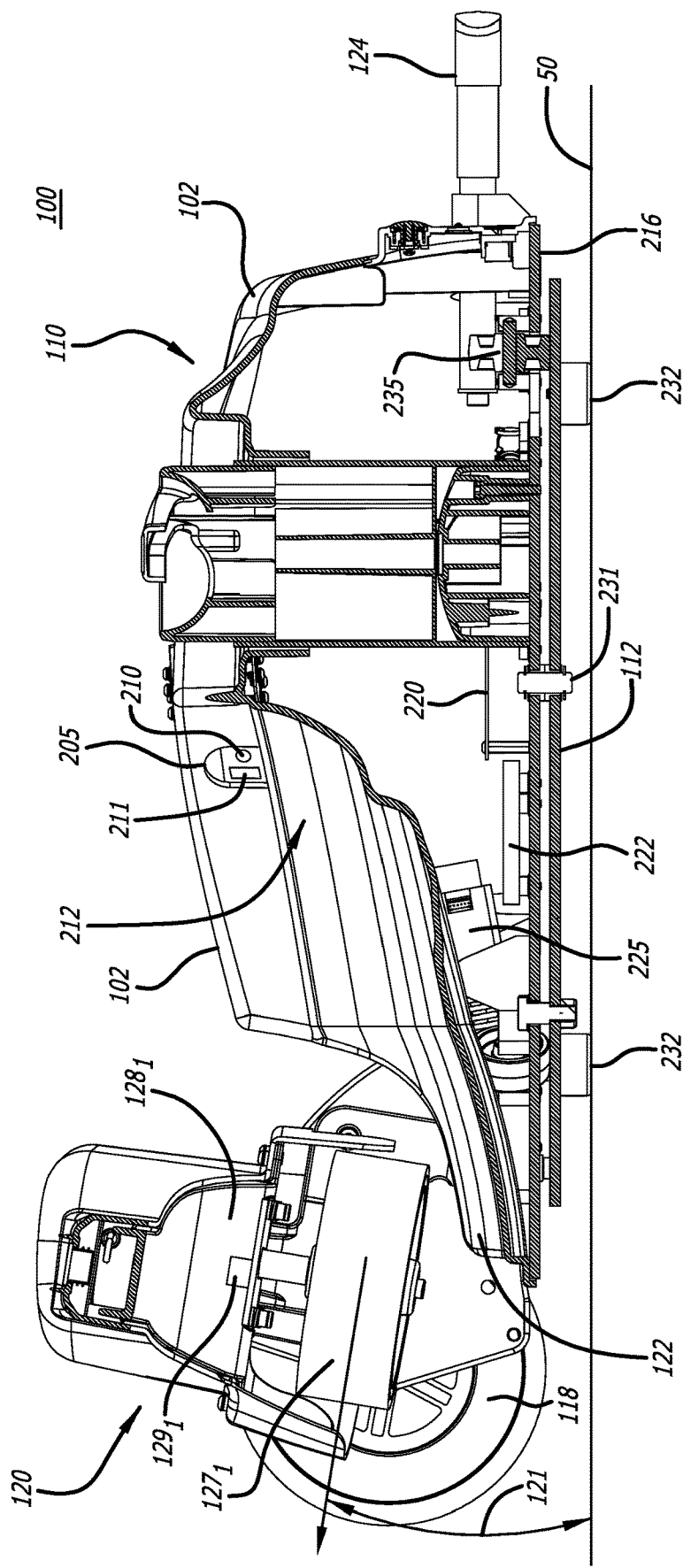
FIG. 2 is a cross-section side view of the ball-throwing machine of FIG. 1 according to some embodiments.

FIG. 1 illustrates a perspective view of a ball-throwing machine 100 (sometimes referred to as an object-throwing apparatus) according to some embodiments, and FIG. 2 is a cross-sectional side view of the ball-throwing machine 100 showing various internal components, where the ball-throwing machine 100 is placed on the ground 50. The ball-throwing machine 100 can be used to pitch a ball, such as to deliver a ball to a user. For example, the ball-throwing machine 100 can be used to deliver a soccer ball or a specialized soccer-type ball to a user. The ball-throwing machine 100 can also be used with various other balls or objects for various other sports.

A remote controller 80 is shown in wireless communication with the ball-throwing machine 100. The remote controller 80 can be a computing device of the player/user, and may be, for example, a smart phone, tablet, laptop, personal digital assistant (PDA), or other wireless handheld device, or even a desktop in some embodiments. The remote controller 80 can communicate wirelessly with a wireless module in the ball-throwing machine 100. The remote controller 80 can include functionality for controlling the training programs that run on the ball-throwing machine 100. For example, the remote controller 80 can include functionality for a user to select training programs to be communicated to the ball-throwing machine 100. Each training program can include a set of drills, commands, or instructions to be executed by the ball-throwing machine 100, such as how many balls to throw in a given period of time, how fast, and with what trajectory. The training programs can be selected and customized by the user.

The illustrated ball-throwing machine 100 includes a housing 102. The ball-throwing machine 100 can be easily movable. For example, the ball-throwing machine can include one or more transport wheels 118, which in some embodiments may be motorized. The ball-throwing machine 100 may also include one or more handles 124 for grasping and manipulating the ball-throwing machine 100 while moving the same. In some embodiments, the one or more handles 124 may be extendable and/or positionable.

With reference to FIGS. 1 and 2, the ball-throwing machine 100 includes a hopper 126. The hopper 126 can be used to receive and/or store balls 90 to later be ejected or thrown by the ball-throwing machine 100. The illustrated embodiment includes a high-volume or large storage-type hopper 126. In some embodiments, the hopper 126 can store as many as 25 balls 90. Of course, it will be understood that the hopper 126 could hold more or less balls 90, as necessary or desired.

Many different styles and types of hoppers can be used. As shown, the hopper 126 is a gravity-type hopper with a spiraling ramp 128 located around a hopper column 130. The hopper column 130 can be used to impart structural strength to the hopper 126 and can also provide appropriate spacing such that balls 90 within the hopper 126 are able to properly rotate and move downward in the hopper 126. Alternatively, the hopper column 130 is not included in some embodiments. Rather, the hopper 126 merely includes the spiraling ramp 128. In another embodiment, the spiraling ramp 128 is omitted and the hopper 126 includes a column that holds a plurality of balls 90.

In some embodiments, the hopper 126 can be transparent. For example, the outer material of the hopper may be clear Plexiglas or plastic, or a thin mesh-like fabric. This transparency can allow the user to view the balls 90 in the hopper 126 and identify when the hopper 126 needs to be reloaded. The hopper 126 can have a top hopper portion 126A and a bottom hopper portion 126B. The top hopper portion 126A can be configured for receiving one or more balls 90 into the hopper 126 and in some embodiments, can hold additional balls 90. The bottom hopper portion 126B can be configured to transition the balls 90 from the hopper 126 into a ball staging area 212, sometimes referred to as the base of the hopper 126.

The hopper 126 can be used for storing the balls 90 when the ball-throwing machine 100 is in use and/or when the ball-throwing machine 100 is not in use. In some embodiments, the hopper 126 can be collapsible or detachable to decrease the size of the ball-throwing machine 100, such as when the ball-throwing machine is not in use. In some embodiments, the hopper column 130 can be a telescoping tube and the outer material of the hopper 126 can be fabric, such that the hopper 126 can increase or decrease in size. In some embodiments with the collapsible hopper 126, the top hopper portion 126A can be collapsed to sit on top of the bottom hopper portion 126B. Alternatively, the hopper column 130 can be configured to be removable to remove structural support separating the top hopper portion 126A from the bottom hopper portion 126B.

Advantageously, in certain embodiments, the ball-throwing machine 100 is designed to deliver soccer balls that are smaller than adult regulation size soccer balls to thereby enable more effective training of ball trapping skills. The smaller surface area of such balls can make the smaller balls harder to trap than regulation size balls (such as size "5" soccer balls). Training with smaller balls can therefore benefit a player using a larger, regulation-size ball in a match because the player may have obtained skills that transfer over to the easier-to-trap, larger ball. In some embodiments, the balls used with the ball-throwing machine 100 are about half the size of regulation size 5 balls, about a third of the size of regulation size 5 balls, about a quarter of the size of regulation size 5 balls, or some other size. For youth players who may already be using a smaller ball than an adult ball in matches, the ball-throwing machine 100 can employ even smaller balls than the youth players use in their matches. For instance, if a youth player typically uses size 4 soccer balls, the ball-throwing machine 100 can throw size 3 soccer balls or smaller, etc. However, in other embodiments, regulation size balls are used instead of smaller balls.

The size of the balls 90 used by the ball-throwing machine 100 can be smaller than a regulation size 3 ball, even for older youth and adult players. For example, in one embodiment, the balls are preferably about 152 mm in diameter. However, in other embodiments the balls can range in size from about 132 mm to about 172 mm in diameter while still providing some or all of the benefits of the balls described herein. In still other embodiments, the balls can range in size from about 115 mm to 215 mm in diameter while still providing at least some of the benefits described herein.

The balls 90 that may be used herein may have any of the following characteristics: a rubber construction, a butyl bladder, one or more nylon plys (such as 1, 2, 3, or 4 or more nylon plys), spiral winding of the nylon plys, and the like. These and other characteristics of the balls, among others (including size, texture, weight, cover type, etc.) can be selected to achieve a desired liveliness or bounciness of the ball. Different balls may be provided with different liveliness for different levels of difficulty. For instance, a ball that has more bounce may be harder to trap and thus appropriate for a higher level of difficulty, while a ball with less bounce may be easier to trap and thus appropriate for a lower level of difficulty. Moreover, the colors of the balls can be selected to target foot-eye coordination. For example, the balls may be blue, green, or red, or a combination of the same, as these colors can be the easier to see than other colors. Alternatively, colors may be selected that are less easy to see so as to increase the difficulty of training. Different colors may be provided for players/users, who may perceive colors slightly differently.

In one embodiment, the balls 90 are not actual soccer balls. For example, a ball having a smaller size than a regulation size ball can be considered to be a ball other than a soccer ball. Counterintuitively, it can be beneficial to train soccer skills (such as trapping) using balls that are not soccer balls, such as any of the balls described herein. Balls used in other sports can also be thrown by the ball-throwing machine 100 for the purposes of training soccer skills. Tennis balls, racquet balls, and squash balls, for instance, can be beneficially used to train trapping skills.

The body 110 of the ball-throwing machine 100 includes a back portion 113 and a front portion 114. The back portion 113 includes the ball staging area 212 and the front portion 114 includes the ball-delivery device 120. As can be seen in FIG. 2, the ball staging area 212 is located adjacent a top of a ball-delivery ramp 122, i.e., between the hopper 126 and the ball delivery ramp 122 and the ball staging area 212 can hold one or more balls 90. Shown disposed within an opening 205 of the housing 102, is a ball sensor (or ball-presence sensor) 211 configured to detect when a ball 90 is present within the staging area 212. The ball-throwing machine 100 can also include one or more ball stops configured to selectively prevent and allow individual balls 90 to (i) travel down the ball-delivery ramp 122 to the ball-delivery device 120 or (ii) travel along various stages of the hopper ramp 128. Also shown in FIG. 2, the ball-throwing machine 100 includes a control unit 220 and a power source 222 (e.g., a rechargeable battery) attached to a base frame member (or frame) 216. In the illustrated embodiment, the ball-throwing machine 100 includes a single ball stop 210 shown with the opening 205. In other embodiments, the ball-throwing machine 100 may include more than one ball stop 210.

As is shown, the front portion 114 also includes at least one opening 116. The opening 116 can provide space for the ball 90 to be thrown through to the player. The opening 116 can be one of many different shapes, such as oval, elliptical, rectangular, triangular, or any other desired shape. In some embodiments, an outer housing of the front portion 114 includes a minimal amount of material, such that a majority, or at least a substantial portion, of the ball-delivery device 120 is exposed and not enclosed. In such embodiments, little to no portion of the outer housing may be between the ball-delivery device 120 and the player.

With further reference to FIG. 2, an embodiment of the ball-delivery device 120 is shown. The ball-delivery device 120 can include any number of various components. The ball-delivery device 120 can be used to impart motion to a ball 90. In some embodiments, the ball-delivery device 120 can be used to control (i) a launch angle 121 of the ball 90 with respect to the ground 50 and (ii) a speed of the ball 90 as it leaves the ball-throwing machine 100. The ball-delivery device 120 can perform these functions in various different manners including those described below. It is to be understood that the ball-delivery device 120 also encompasses various other systems and methods of performing the above functions, as well as other, additional and/or alternative functions.

As illustrated, the ball-delivery device 120 includes one or more launch wheels or balls (e.g., the two launch wheels $127_1$-$127_2$, which may be referred to collectively or individually as "a launch wheel 127") which are used to impart a speed, a spin, and/or a lateral direction to the ball 90. The ball-delivery device 120 can also include one or more launch-wheel motors $128_1$-$128_2$ (which may be referred to collectively or individually as "a launch wheel 127"), which are connected to the launch wheels 127 to cause the launch wheels 127 to rotate, which rotation imparts the speed, spin, and/or lateral direction to the ball 90. In some instances, the two launch wheels 127 may rotate at the same rate, and in other instances the two launch wheels 127 may rotate at different rates to impart a spin to the ball 90 so as to cause the ball 90 to curve when launched. In the embodiment illustrated in FIG. 1, the ball-delivery device 120 includes two launch-wheel motors $128_1$-$128_2$, where a first launch wheel motor $128_1$ is configured to control a first launch wheel $127_1$ and a second launch wheel motor $128_2$ is configured to control a second launch wheel $127_2$. Additionally, the two launch-wheel motors $128_1$-$128_2$, may each include an encoder attached thereto. FIG. 2 illustrates the encoder $129_1$ attached to the launch-wheel motor $128_1$. A similar configuration may exist for an encoder coupled to the launch-wheel motor $128_2$. Further detail regarding the encoder(s) is described below with respect to at least FIG. 17.

With reference to both FIGS. 1 and 2, the ball-delivery device 120 is rotatably coupled with the base frame member 216 at rotatable coupling points 115. Rotation of the ball-delivery device 120 with respect to the base frame member 216 defines the launch angle 121 of the ball 90. The ball-throwing machine 100 also includes a launch angle actuator 225 coupled between the ball-delivery device 120 and the base frame member 216, where the launch angle actuator 225 is configured to control or adjust an angle of the ball delivery device 120 with respect to the base frame member 216 to define the launch angle 121 of the ball 90 with respect to the ground 50. The launch angle actuator 225 may include a motor of any suitable type, such as a brushed DC motor, a servo motor, or a stepper motor, for example.

The ball-throwing machine 100 includes a base plate 112 rotatably coupled with the base frame member 216 via an axle 231 extending between a base plate 112 and the base frame member 216. The base plate 112 includes a number of feet 232 configured to provide a stable placement of the ball-throwing machine 100 on the ground 50. A lateral direction actuator 235 is coupled between the base plate 112 and the base frame member 216 such that operation of the lateral direction actuator 235 causes the base frame member 216 to rotate with respect to the base plate 112 during use. The rotation of the base frame member 216 with respect to the base plate 112 defines the lateral (side by side) direction of the trajectory. The lateral direction actuator 235 may include a motor of any suitable type, such as a brushed DC motor, a servo motor, or a stepper motor, for example.

Figure 3:
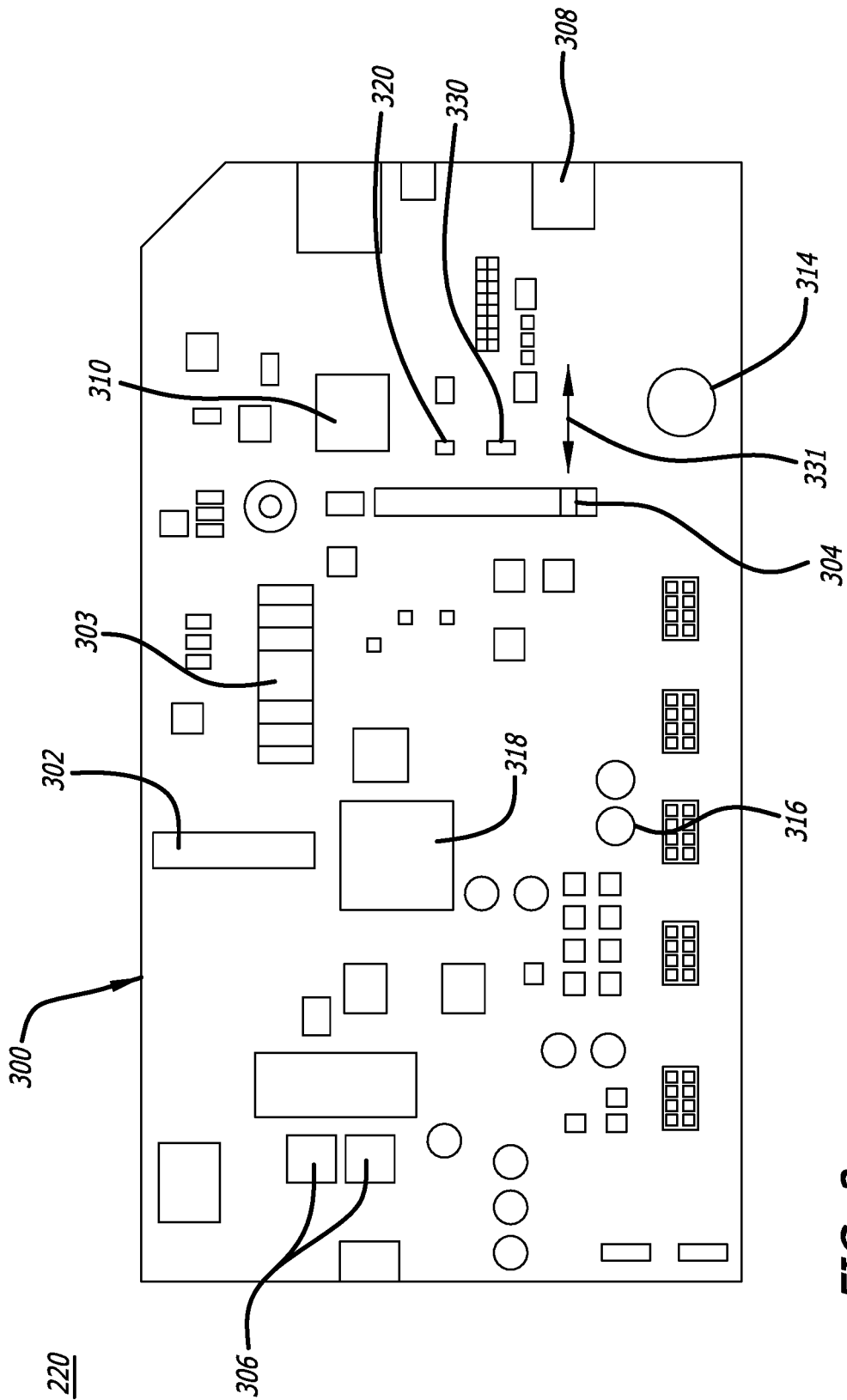
FIG. 3 is a top view of a control unit of the ball-throwing machine of FIG. 1 according to some embodiments.
Figure 10:
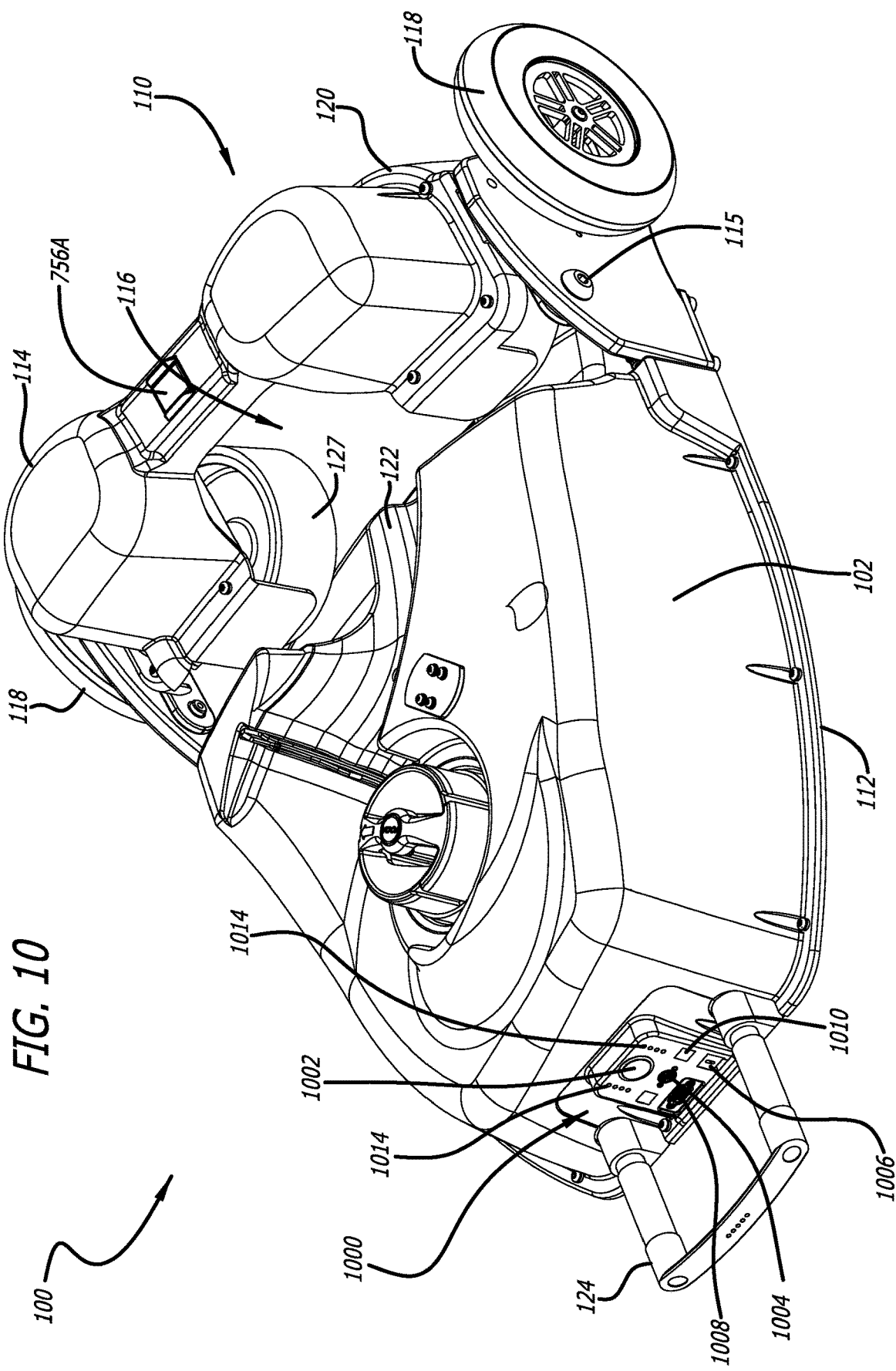
FIG. 10 is a perspective rear view of the ball-throwing machine of FIG. 1 with the ball hopper removed according to some embodiments.

FIG. 3 illustrates a top view of the control unit 220. The control unit 220, having a control circuit, can include various features that can be used to control the ball-throwing machine 100 including the ball-delivery device 120. The control unit 220 includes a circuit card assembly (CCA) 300 having electronic circuitry that includes inter alia a power connector 302, an interface module connector 303, a daughter board connector 304, launch motor drivers 306, a wireless module (e.g., BLUETOOTH™) 308, and a processor 310. The CCA 300 may also be referred to as a printed circuit board assembly (PCBA), a printed circuit assembly (PCA), or a circuit board. Memory 312 (e.g., a non-transitory computer-readable medium) includes program instructions stored thereon for controlling the various electrical features of the ball-throwing machine 100, such as the launch motors 128 of the ball-delivery device 120 and other actuators as described above. The power connector 302 provides for a wired connection to the power source 222, the interface module connector 303 provides for a wired connection to the interface module 1000 (see FIG. 10), and the daughter board connector 304 provides for a wired connection to a daughter board (not shown). The inclusion of a daughter board within the circuit-board architecture is to allow for many possible types of additional functions to the ball-throwing machine 100, which may currently be unforeseen, or may be required on only a small number of units, or otherwise be an optional items. As an example, a daughter board may be utilized to enable a wired communication over a serial port to the controller via the 9-pin connector 1008 on the back of user interface module 1000 (FIG. 10). The launch motor drivers 306 provide electrical power to the launch motors 128 as defined by electrical signals from the processor 310. The CCA 300 further includes an audio notification device 314 (e.g., a buzzer or a speaker) configured to provide various audible notifications or alerts to the user as defined by the logic.

The wireless module 308 is configured to enable communication of the ball-throwing machine 100 with at least the remote controller 80. For example, the wireless module 308 enables the ball-throwing machine 100 to receive operating commands from the remote controller 80 and to transmit operational data to the remote controller 80.

In the illustrated embodiment, the control unit 220 includes one or more operational sensors configured to monitor operation of the ball-throwing machine 100, such as detecting anomalous operating conditions, for example. The control unit 220 may include a microphone 320 electrically coupled with the CCA 300 so that the logic when executed by the processor 310 may analyze sound data and determine therefrom if the ball-throwing machine 100 is operating normally, i.e., the logic may determine from the sound data the ball-throwing machine 100 is operating abnormally or anomalously in any number of ways. The microphone 320 is directly attached to the CCA 300 to enhance a reliability and reduce the cost of the ball-throwing machine 100 by eliminating wires, connectors, and specific microphone mounting components. During operation, the ball-throwing machine 100 generates various noises, i.e., sound data, associated with normal operation, and the ball-throwing machine 100 may also generate different sound data associated with abnormal operation.

By way of one example, during normal operation, the motors 128 may define an expected sound data (e.g., a hum) as they rotate the launch wheels 127 at specifically defined speeds (RPM). In an instance where one of the motors 128 has a defect, such as worn out motor bearing, for example, the motors 128 may generate anomalous sound data, i.e., a sound data that is different from the expected sound data. In such as instance, the microphone 320 may pick up (i.e., hear) the anomalous sound data and determine therefrom that the one of the motors 128 is not operating properly.

By way of another example, the ball stop 210 may generate a noise when it transitions from (i) a first state preventing a ball 90 from traveling down the ball-delivery ramp 122 to the ball-delivery device 120 to (ii) a second state allowing a ball 90 to travel down the ball-delivery ramp 122 to the ball-delivery device 120. Coincident with a logic command to transition the ball stop 210 from the first state to the second state, the logic may look for an expected sound signature (as may be stored in memory) associated with normal transitioning from the first state to the second state. If the expected sound signature is not detected, the logic may determine that the ball stop 210 did not transition from the first state to the second state. In the illustrated embodiment, the microphone 320 may be located in close proximity to the ball stop 210, such as directly beneath ball stop 210 so that the microphone 320 may obtain an accurate sound data from the ball stop 210. Furthermore, the ball stop 210 may be mounted to the housing 102 such that the housing 102 acts as a sound board to generate the sound signature.

In a similar fashion, coincident with a logic command to transition the ball stop 210 from the first state to the second state thereby allowing the ball 90 to travel down the launch ramp 122 to the ball-delivery device 120, the logic may look for an expected sound signature associated with the launching of the ball 90. If the expected sound signature is not detected, the logic may determine that the ball 90 was not launched and that the launch as abnormal.

The control unit 220 may include, alternatively or in addition to the microphone 320, an accelerometer 330 electrically coupled with the CCA 300 so that the logic when executed by the processor 310 may analyze vibration data (or more broadly motion data) of the base frame member 216 and determine therefrom if the ball-throwing machine 100 is operating normally, i.e., the logic may determine from the vibration data if the ball-throwing machine 100 is operating abnormally in any number of ways. Similar to the microphone 320, the accelerometer 330 is directly attached to the CCA 300 to enhance a reliability and reduce the cost of the ball-throwing machine 100 by eliminating wires, connectors, and specific accelerometer mounting components. Furthermore, the CCA 300 is directly attached to the base frame member 216 so that the accelerometer 330 may obtain an accurate reading of motion/vibration of the base frame member 216. During normal operation, the operation of the ball-throwing machine 100 may cause the base frame member 216 to move in various expected ways, where such movement causes vibration data associated with normal operation, and the accelerometer 330 may detect or determine vibration data. In an instance of abnormal operation, the ball-throwing machine 100 may cause the base frame member 216 to move in ways associated with abnormal operation different from normal operation. Accordingly, the accelerometer 330 may be configured to detect a difference in vibration or motion of the base frame member 216 generated by the ball-throwing machine 100 between normal operation and abnormal operation.

By way of one example, during normal operation, the launch wheels 127 may define an expected vibration data as they rotate at specifically defined speeds (RPM). In some instances, the launch wheels 127 may wear out causing an imbalance of the launch wheels 127. As such, the imbalance may cause a difference (e.g., increase) in vibration of the base frame member 216 when the launch wheels 127 are rotated. Accordingly, the accelerometer 330 may detect vibration data that is different from an expected vibration signature. In response, the logic may determine that at least one of the launch wheels 127 is out of balance.

By way of another example, the base frame member 216 may move or vibrate in response to the launching of the ball 90, i.e., the base frame member 216 along with the ball-throwing machine 100 as a whole may kick or lurch in the rearward direction when the launch wheels 127 impart a speed to the ball 90. As such, coincident with each launch of a ball 90, the logic may look for expected vibration data associated with normal launch characteristics. If the detected vibration data is different from the expected vibration data (e.g., a vibration signature stored in memory), the logic may determine that the ball 90 was not launched as intended, e.g., not launched or launched abnormally. There are several potential causes for an abnormal ball launch, such as a wrong ball size, a deflated ball, a worn out ball, a ball having a slippery or wet surface, or worn out launch wheels, for example. In some embodiments, the accelerometer 330 may include a sensing orientation as indicated by the arrow 331. In such an embodiment, accelerometer 330 may be oriented so that the sensing orientation 331 is aligned with a front/rear direction of the ball-throwing machine 100 as shown in FIG. 3.

In a similar fashion as described above, the microphone 320 and/or the accelerometer 330 may be used to monitor operation of the launch angle actuator 225 and/or the lateral direction actuator 235. In other words, the microphone 320 and/or the accelerometer 330 may be deployed to determine if, upon an actuation command, one or both of the launch angle actuator 225 or the lateral direction actuator 235 normally operate, abnormally operate, or fail to operate.

It will be understood that the ball-delivery device 120 can function in many different ways, including ways different from those described herein. For example, rather than including a launch angle actuator 225 or a lateral angle actuator 235, the ball-delivery device 120 can be moved or positioned manually. Further, although described as being primarily used for pitching soccer balls, the ball-delivery device 120 can also be adapted to pitch other types of balls, such as baseballs, softballs, tennis balls, racquet balls, squash balls, cricket balls, lacrosse balls, volleyballs, and the like.

The CCA 300 may also include a current sensor 316 and/or a temperature sensor 318. In some embodiments, the current sensor 316 may be included in the CCA 300 and be configured to measure the current flowing to one or more of the wheel motors 128. In some embodiments, the CCA 300 may include two current sensors 316 such that a first current sensor 316 measures the current through a first wheel motor $128_1$ and a second current sensor $128_2$. In some embodiments, the current sensor 316 may be a Hall Effect current sensor. The current sensor 316 may be an integrated circuit (IC) or surface-mount device (SMD) component that is disposed on the CCA 300. As the ball-delivery device 120 operates during the process of carrying out a training program as discussed herein, the current sensor 316 may continuously monitor the current drawn by a wheel motor 128.

Figure 11:
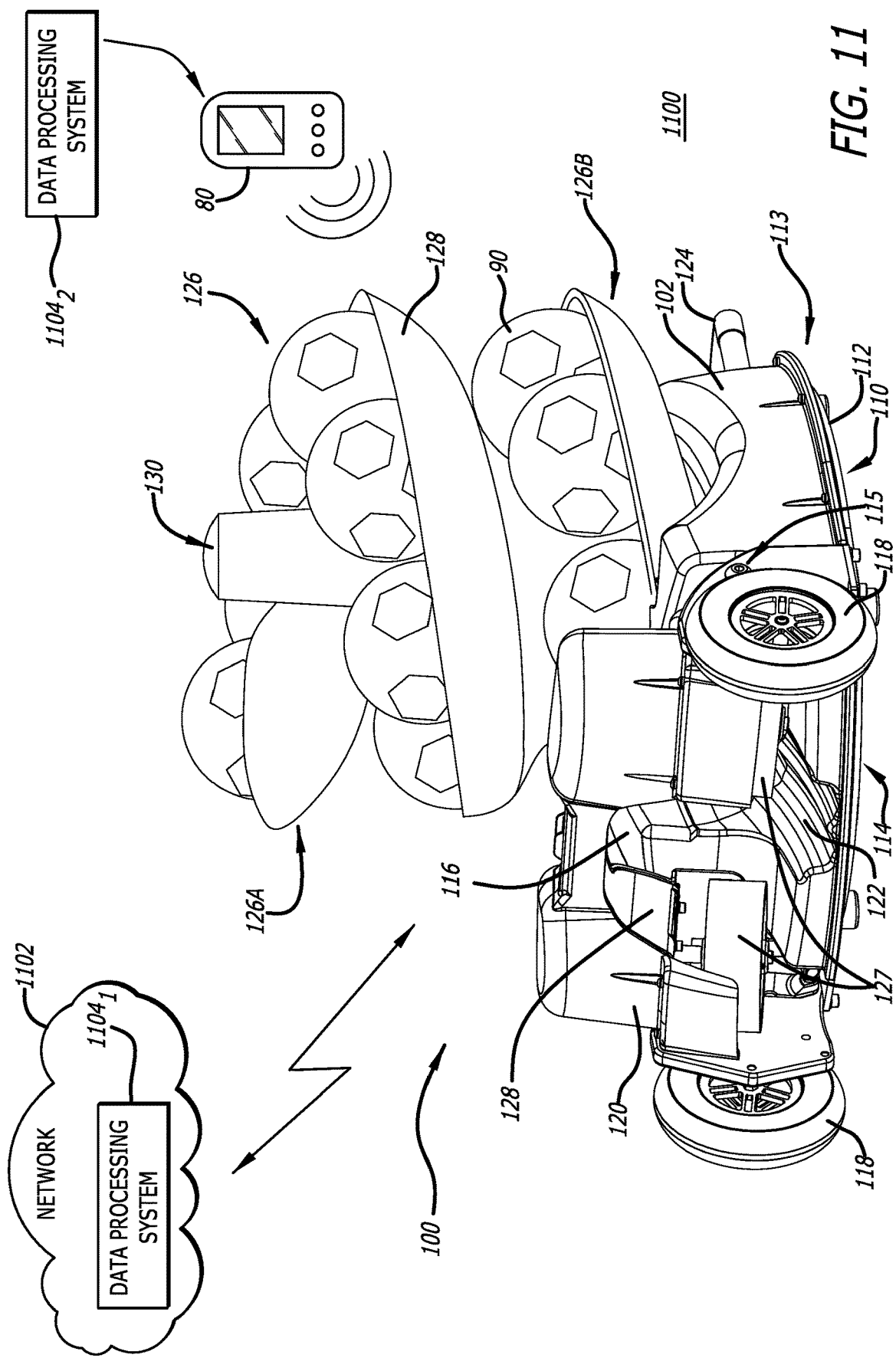
FIG. 11 is a block diagram illustrating a first system architecture of a ball-throwing machine coupled to data processing system operating within a networked environment in accordance with some embodiments.
Figure 12:
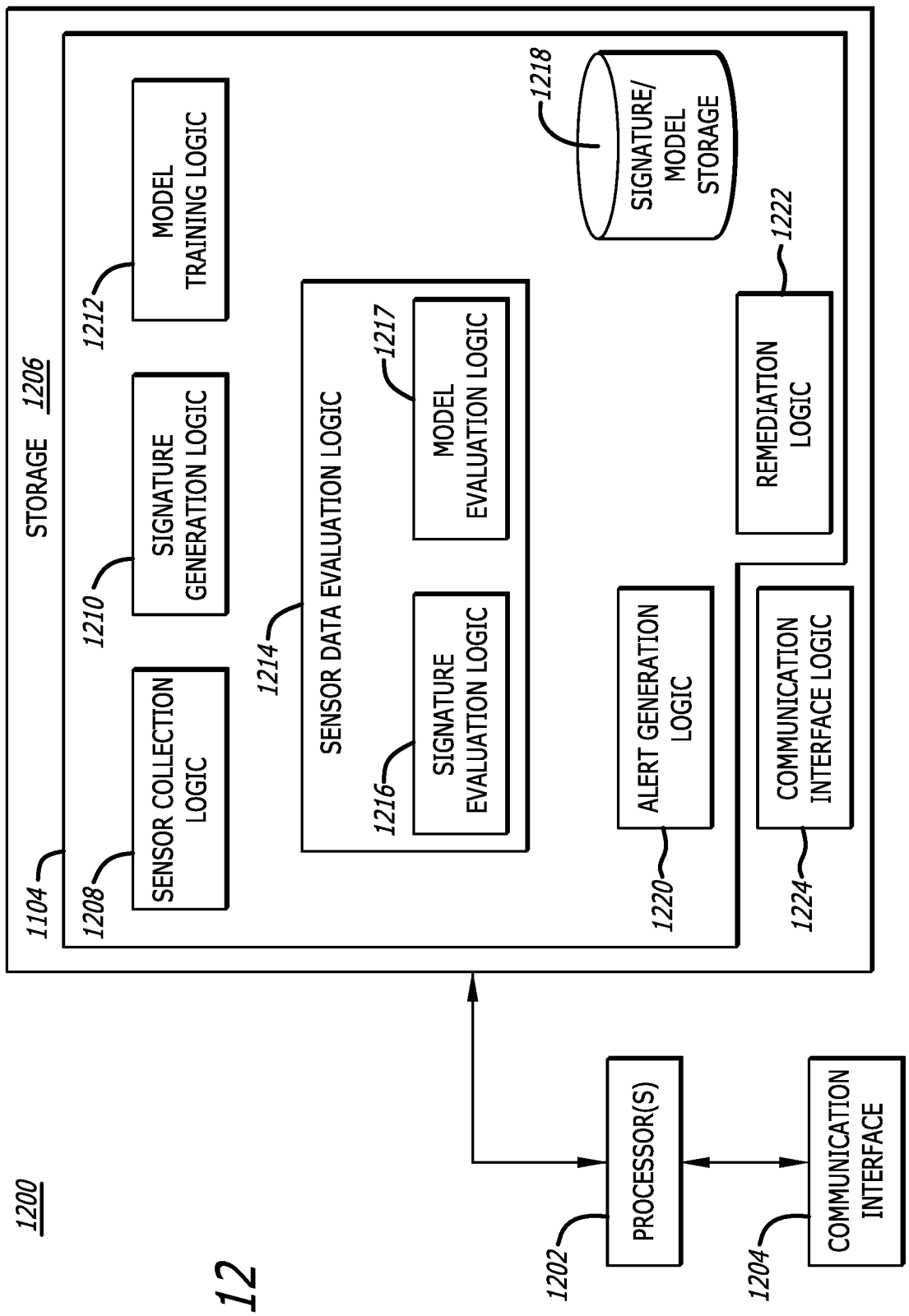
FIG. 12 is a logic diagram illustrating a logic modules of the data processing system ("system") of FIG. 11 stored on non-transitory storage and configured to be executed by one or more processors in accordance with some embodiments.

In some instances, the current value measured by the current sensor 316 may be provided to logic of the system 1104 (as shown in FIGS. 11-12). In some particular examples, the sensor data evaluation logic 1214 obtains the measured current values and compares the same to one or more thresholds, where the one or more thresholds indicate whether a wheel motor 128 is drawing too much current. As a result, an alert or flag may be generated for an administrator or other user. In some instances, based on a threshold comparison, the CCA 300 may be instructed to take action including pausing execution of code responsible for carrying out a training program. As such, pausing the execution of the code include instructing the wheels to stop spinning allowing the current draw to decrease. For example, when a measured current value exceed a first threshold, the alert generation logic 1220 may generate an alert for an administrator or other user and when a second threshold is exceeded (the second threshold representing a greater current value than the first threshold), an instruction to pause execution of the code as described above may be provided to the CCA 300.

In some embodiments, the temperature sensor 318 may be included in the CCA 300 and be configured to measure an ambient temperature of the CCA 300, which is indicative of current being drawn by one or more of the wheel motors 128. As discussed above, the amount of current drawn by one or more of the wheel motors 128 is indicative of how fast the wheels 127 are spinning. In some instances, the temperature value measured by the temperature sensor 318 may be provided to logic of the system 1104 (as shown in FIGS. 11-12). In some particular examples, the sensor data evaluation logic 1214 obtains the measured temperature values and compares the same to one or more thresholds in the same manner as the measured current value as described above. Further, similar actions may be performed in response to the threshold comparisons.

Figure 4:
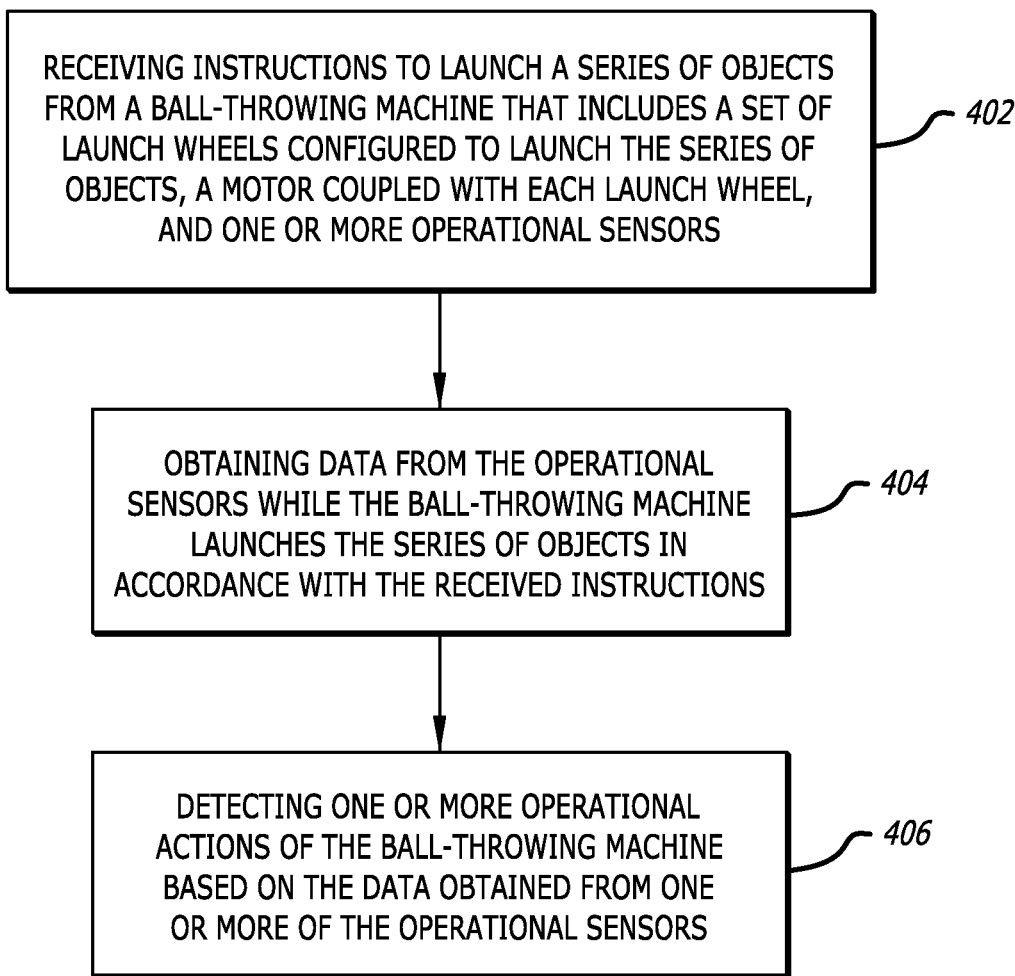
FIG. 4 is a block diagram of a first computerized method of the ball-throwing machine of FIG. 1 according to some embodiments.

FIG. 4 is a block diagram of a computerized method 400 that, according to some embodiments, includes all or any subset of the following actions, operations, or processes. Each block illustrated in FIG. 4 represents an operation of the method 400 performed by the ball-throwing machine disclosed herein, and typically as a result of execution of logic of the ball-throwing machine. The method 400 may include receiving instructions to launch a series of objects from a ball-throwing machine that includes a set of launch wheels configured to launch the series of objects, a motor coupled with each launch wheel, and one or more operational sensors (block 402). In some embodiments of the method 400, launching the series of objects includes rotating the set of launch wheels to cause delivery of the series of objects to a player, where the series of objects may include one or more balls. In some embodiments of the method 400, the one or more operational sensors include at least one of an accelerometer or a microphone. The method 400 may further include obtaining data from the operational sensors while the ball-throwing machine launches the series of objects in accordance with the received instructions (block 404). The method 400 may further include detecting one or more operational actions of the ball-throwing machine based on the data obtained from one or more of the operational sensors (block 406). In some embodiments, the computerized method 400 further includes (i) analyzing the data pertaining to the operation of the ball-throwing machine and (ii) detecting that the launch of the first object was anomalous through comparison of the data pertaining to the operation of the object-throwing apparatus to a data signature stored in memory of the ball-throwing machine, where the data signature represents an expected set of data corresponding to the launch of the series of objects. In some embodiments, the method 400 further includes (i) analyzing the data pertaining to the operation of the ball-throwing machine, where the data pertaining to the operation of the ball-throwing machine includes at least one of vibration data or sound data; and (ii) detecting that the ball-throwing machine is performing anomalously through comparison of the data pertaining to the operation of the ball-throwing machine to a data signature representing an expected vibration data or sound data.

Figure 5A:
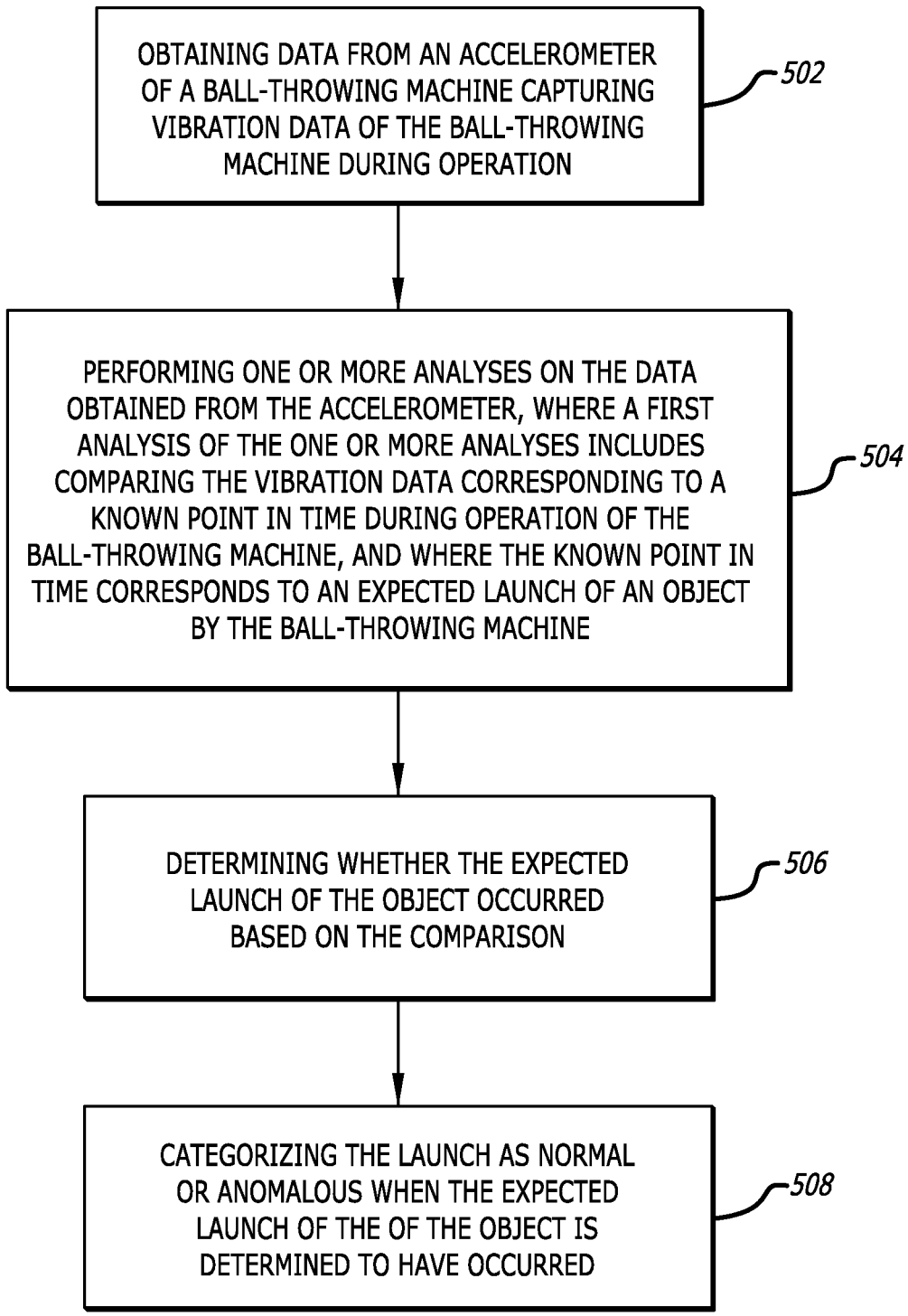
FIG. 5A is block diagram of a second computerized method of the ball-throwing machine of FIG. 1 according to some embodiments.

FIG. 5A is a block diagram of a computerized method 500 that, according to some embodiments, includes all or any subset of the following actions, operations, or processes. Each block illustrated in FIG. 5 represents an operation of the method 500 performed by a ball-throwing machine disclosed herein, and typically as a result of execution of one or more logic modules disclosed of the ball-throwing machine. The method 500 may include obtaining data from an accelerometer of a ball-throwing machine capturing vibration data of the ball-throwing machine during operation (block 502). The method 500 may further include performing one or more analyses on the data obtained from the accelerometer, where a first analysis of the one or more analyses includes comparing the vibration data corresponding to a known point in time during operation of the ball-throwing machine, and where the known point in time corresponds to an expected launch of an object by the ball-throwing machine (block 504). The method 500 may further include determining whether the expected launch of the object occurred based on the comparison (block 506). The method 500 may further include categorizing the launch as normal or anomalous when the expected launch of the of the object is determined to have occurred (block 508).

Figure 5B:
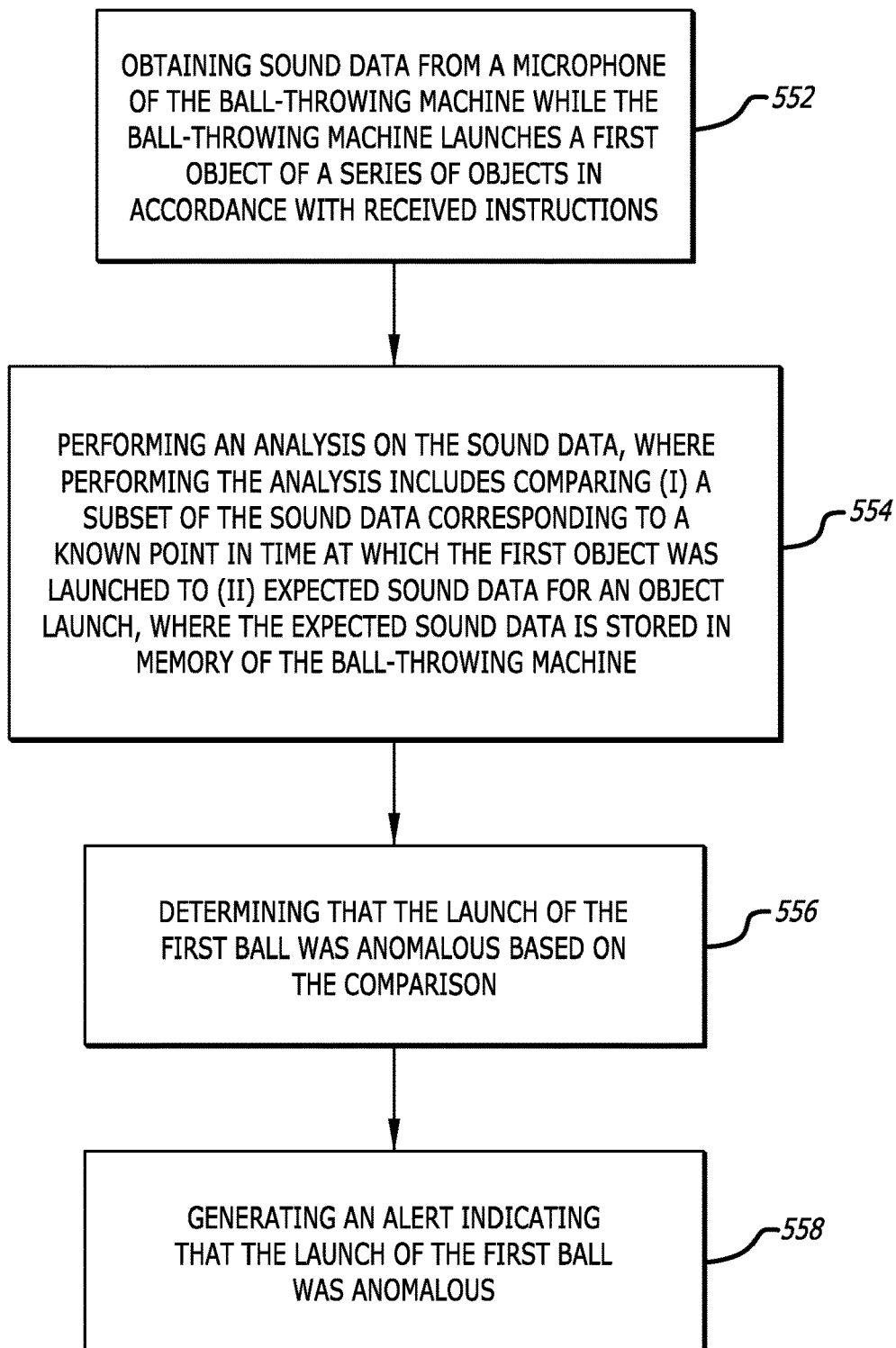
FIG. 5B is block diagram of a third computerized method of the ball-throwing machine of FIG. 1 according to some embodiments.

FIG. 5B is a block diagram of a computerized method 550 that, according to some embodiments, includes all or any subset of the following actions, operations, or processes. Each block illustrated in FIG. 5 represents an operation of the method 550 performed by a ball-throwing machine disclosed herein, and typically as a result of execution of one or more logic modules disclosed of the ball-throwing machine. The method 550 may include obtaining sound data from a microphone of the ball-throwing machine while the ball-throwing machine launches a first object of a series of objects in accordance with received instructions (block 552). The method 550 may further include performing an analysis on the sound data, where performing the analysis includes comparing (i) a subset of the sound data corresponding to a known point in time at which the first object was launched to (ii) expected sound data for an object launch, where the expected sound data is stored in memory of the ball-throwing machine (block 554). The method 550 may further include determining that the launch of the first ball was anomalous based on the comparison (block 556) and generating an alert indicating that the launch of the first ball was anomalous (block 558). In some embodiments of the method 550, the alert is recorded in a data log. In some embodiments of the computerized method 550, a control circuit of the ball-throwing machine is configured to receive instructions to launch the series of objects, where the instructions indicate a number of objects to be launched and at least a speed or a trajectory for each of the objects to be launched.

Figure 6A:
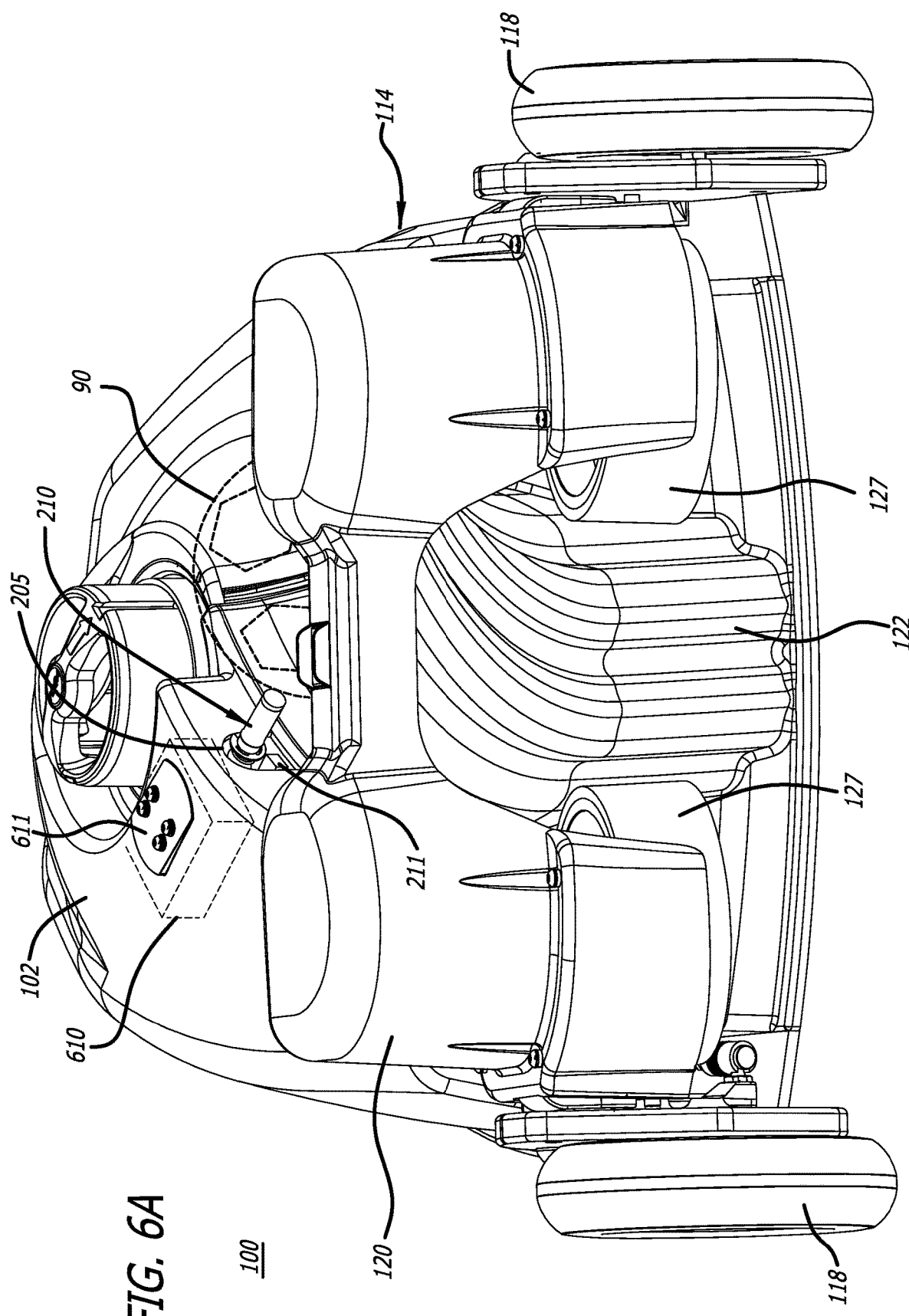
FIG. 6A is a front view of the ball-throwing machine of FIG. 1 with the ball hopper removed according to some embodiments.

FIG. 6A is a front view illustration of the ball-throwing machine 100 with the hopper 126 removed. Shown is the ball-delivery ramp 122 positioned between the launch wheels 127 of the ball-delivery device 120. Also shown in phantom lines is the ball 90 located in the ball staging area 212 (see FIG. 2). As discussed above, the ball-throwing machine 100 includes the ball stop 210 that prevents the ball 90 from exiting the ball staging area 212 and the ball sensor 211 that detects the presence of the ball 90 within the staging area 212. The ball stop 210 include a solenoid 610 shown hidden beneath the housing 102. The solenoid 610 is attached to an underside of the housing 102 via the solenoid mount 611.

Figure 6B:
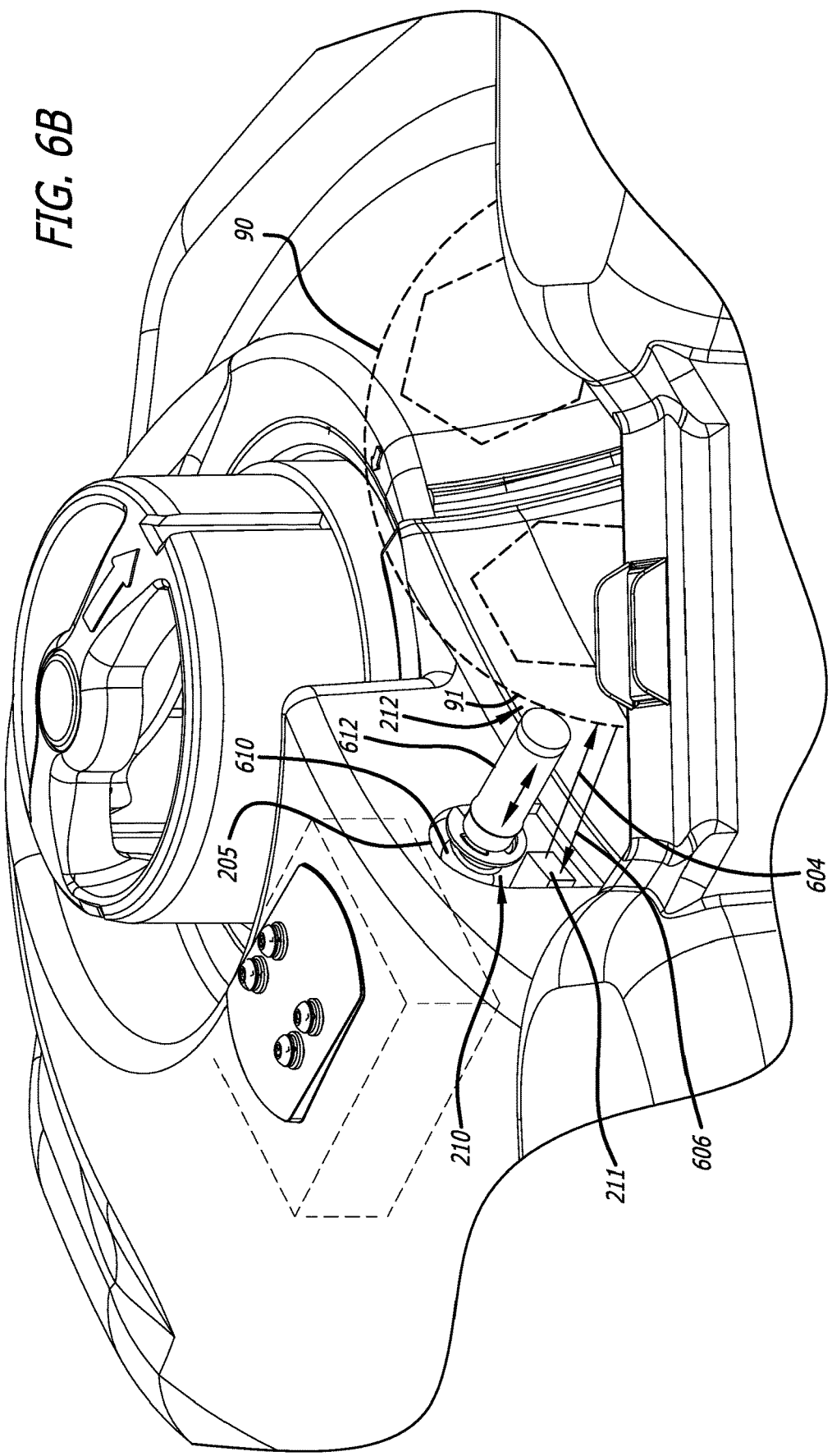
FIG. 6B is a detailed view of a portion of the ball-throwing machine of FIG. 1 showing the ball sensor and the ball stop according to some embodiments.

FIG. 6B is a detailed view of a portion of the ball-throwing machine 100 showing the ball stop 210 and the ball sensor 211 disposed within the opening 205. The ball stop 210 further includes a protrusion 612 operatively coupled with the solenoid 610 so that the protrusion 612 may extend through the opening 205. In accordance with actuation of the solenoid 610, the protrusion 612 is selectively positionable between an extended position and a retracted position. In the extended position, the protrusion 612 protrudes from the opening 205 to engage the ball 90 so as to retain the ball 90 within the staging area 212. In the retracted position, the protrusion 612 disengages the ball 90 to allow the ball 90 to exit the staging area 212 and travel down the ball-delivery ramp 122 to the ball-delivery device 120 for launching. In the illustrated embodiment, the protrusion 612 is biased towards the extended position, such that when the solenoid 610 is deactivated (i.e., de-energized) the ball 90 is retained within the staging area 212 and prevented from being launched. One advantage of biasing the protrusion 612 toward the extended position is that balls 90 can be stored in the staging area 212 and the hopper 126 when the ball-throwing machine 100 is not in use.

As discussed above, the ball sensor 211 detects the presence and/or absence of a ball 90 within the staging area 212. In the illustrated embodiment, the ball sensor 211 is coupled with the underside of the housing 102. In some embodiments, the ball sensor 211 may be directly attached to the solenoid 610 which is attached to the underside of the housing 102. The ball sensor 211 may be any type of sensor capable of detecting the presence of the ball 90, such as a ball activated switch, a proximity sensor, a capacitive sensor, an inductive sensor, or an optical sensor, for example. In the illustrated embodiment, the ball sensor 211 is an optical sensor configured to project an emitted light signal 606 through the opening 205 and into the staging area 212. The ball sensor 211 is further configured and detect a reflected light signal 604, i.e. a reflection of the emitted light signal 606 off of a surface 91 of the ball 90 when the ball 90 is disposed within the staging area 212. As the ball 90 includes different colors, e.g., black and white, and as the surface of the ball 90 may include seams that may affect reflection, the emitted light signal 606 may include a defined wavelength spectrum for optimal operation and/or reliability of ball detection. In the illustrated embodiment, the ball sensor 211 includes a laser configured to project the emitted light signal 606 having a wavelength within the red light spectrum to optimize operation and/or reliability of ball detection. As is known in the art, the red light spectrum range is often considered light waves having a wavelength within a range of 620 nanometers (nm) through 700 nm.

Figure 7:
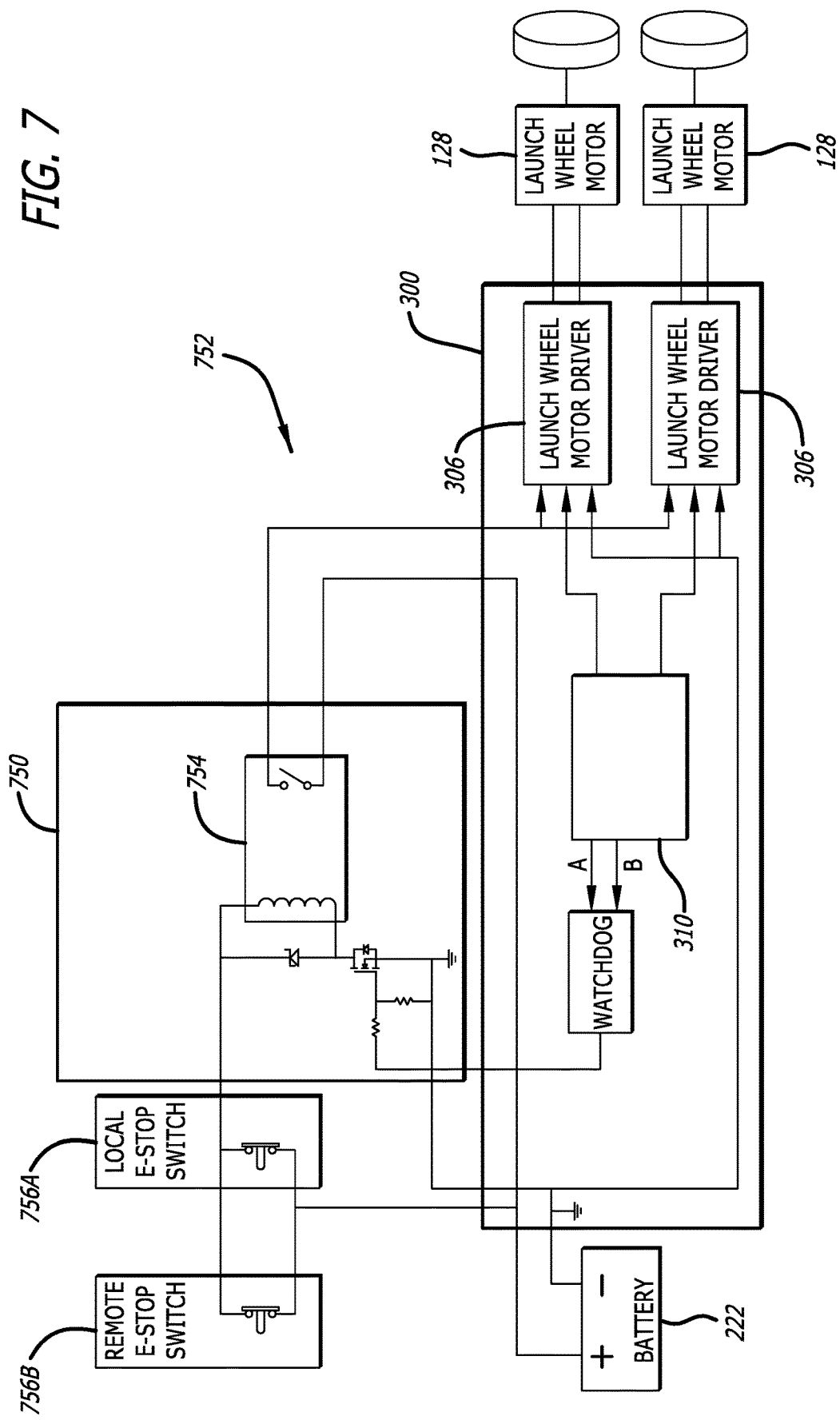
FIG. 7 is a schematic illustration of an emergency stop circuit the control unit of FIG. 3 according to some embodiments.

FIG. 7 is a schematic illustration of an optional emergency stop circuit 752 of the control unit 220 according to some embodiments. The emergency stop circuit 752 is a hardwired, fail-safe circuit that will disconnect power to the motors 128 when deployed. In some embodiments, the emergency stop circuit 752 can be connected to external equipment or devices via a wired connection, such as via two dedicated pins on the 9-pin serial connector 1008 (see FIG. 10), for example. The emergency stop circuit 752 is configured to allow the motors 128 to run when the two pins are connected together. If the two pins are not connected together, the emergency stop circuit will cut power to the launch motors 128.

As shown in FIG. 7, one exemplary implementation of the emergency stop circuit 752 may include a daughter CCA 750 coupled with the CCA 300. In the illustrated embodiment, a first portion of the emergency stop circuit 752 is located on the daughter CCA 750 and a second first portion of the emergency stop circuit 752 is located on the CCA 300. In other implementations, the daughter CCA 750 may be omitted such that both the first and second portions of the emergency stop circuit 752 are located on the CCA 300.

The daughter CCA 750 includes inter alia an emergency stop relay 754 where an output of the emergency stop relay 754 is connected serially inline what the launch motors 128. As such, when the emergency stop relay 754 is de-energized, the emergency stop (e-stop) relay 754 interrupts the power connection to the launch motors 128. More specifically, the emergency stop relay 754 is a normally open relay.

In some embodiments, the watchdog component will enable the e-stop function when the microprocessor 310 is failing to properly produce the A-B toggle function. The A-B toggle function includes the microprocessor 310 setting the A pin 'high' and the B pin 'low'. Then, within a specified amount of time, the microprocessor 310 is to set the A pin 'low' and the B pin 'high', and further, within the same specified amount of time revert back. The A-B toggle function is to be performed continually. The watchdog component monitors this toggle and when it determines that the values of the A-B pins are not being toggled properly, the e-stop relay 754 is enabled.

An input of the emergency stop relay 754 is coupled with an emergency stop switch according to alternate configurations. In a first configuration, a local emergency stop switch 756A is operatively coupled with the input of the emergency stop relay 754 such that when the local emergency stop switch 756A is closed, the emergency stop relay 754 is energized and when the local emergency stop switch 756A is open, the emergency stop relay 754 is de-energized thereby cutting power to the launch motors 128. In some embodiments, the local emergency stop switch 756A may be located on the motor head as shown in FIG. 10. However, in other embodiments, the local emergency stop switch 756A may be located on the interface module 1000.

In an alternate second configuration, a remote emergency stop switch 756B is operatively coupled with the input of the emergency stop relay 754, such as via a wired connection including the two dedicated pins on the 9-pin serial connector 1008, for example. As such, the remote emergency stop switch 756B operates similar to the local emergency stop switch 756A, i.e., allowing operation of the launch motors 128 when the remote emergency stop switch 756B is closed and preventing operation of the launch motors 128 when the remote emergency stop switch 756B is open.

Figure 8:
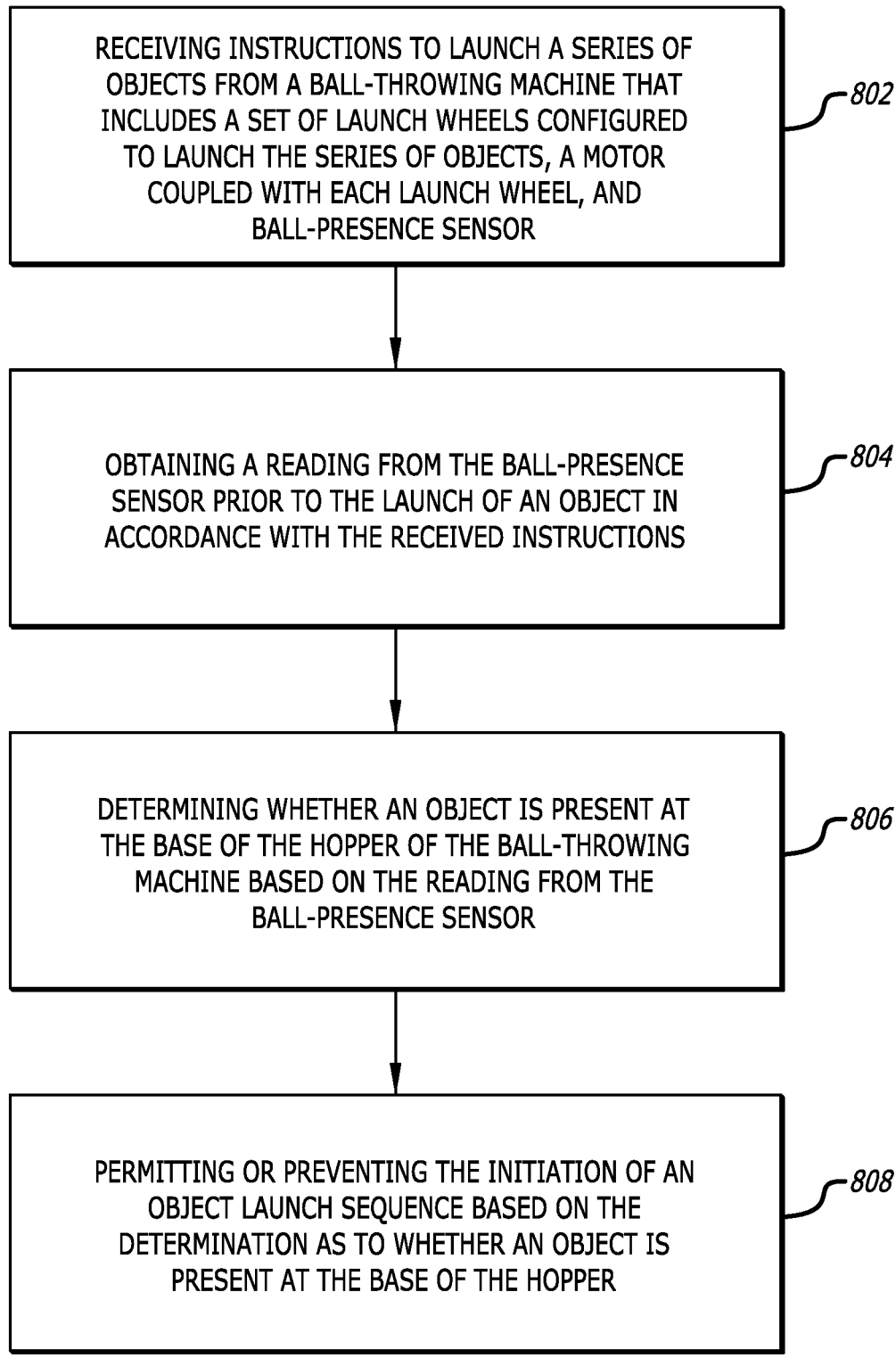
FIG. 8 is block diagram of a fourth computerized method of the ball-throwing machine of FIG. 1 according to some embodiments.

FIG. 8 is a block diagram of a computerized method 800 that, according to some embodiments, includes all or any subset of the following actions, operations, or processes. Each block illustrated in FIG. 8 represents an operation of the method 800 performed by the ball-throwing machine disclosed herein, and typically as a result of execution of logic of the ball-throwing machine. The method 800 may include receiving instructions to launch a series of objects from a ball-throwing machine that includes a set of launch wheels configured to launch the series of objects, a motor coupled with each launch wheel, and ball-presence sensor (block 802). The method 800 may further include obtaining a reading from the ball-presence sensor prior to the launch of an object in accordance with the received instructions (block 804). In some embodiments of the method 800, the ball presence sensor is an optical sensor configured to detect light reflected off an external surface of an object of the series of objects. The method 800 may further include determining whether an object is present at the base of the hopper of the ball-throwing machine based on the reading from the ball-presence sensor (block 806). The method 800 may further include permitting or preventing the initiation of an object launch sequence based on the determination as to whether an object is present at the base of the hopper (block 808).

In some embodiments, the method 800 may permit the initiation of an object launch and/or include performance of any of the following operations following block 808: repeat the method 800 beginning at block 804 (e.g., obtain a second, subsequent reading from the ball-presence sensor and re-assess whether a ball is present); pause execution of the software code corresponding to the training program for a predetermined amount of time (e.g., 5, 10, 15 seconds, etc.) in order to provide time for a ball to fall down the hopper or give a trainer or user an opportunity to place a ball in the hopper; pause the execution of the software code corresponding to the training program and activate a stepper motor or the solenoid of the ball-throwing device 100, which is intended to shake or vibrate the ball-throwing machine 100 and cause a ball to fall from a point into the hopper down to the base of the hopper; etc.

In some instances, responsive to a determination that an object is not present at the base of the hopper, the method 800 may ignore such a determination and assume that the ball-presence sensor is broken, faulty, or otherwise not working properly. In such instances, the method 800 may permit the ball-throwing machine 100 to continue operating and carrying out a training program while monitoring whether one or more balls are launched in accordance with the training program through other methodologies such as monitoring current usage as discussed above with respect to the current sensor 316 and the temperature sensor 318, or through detecting a launch of balls through analysis of captured video of the training session (e.g., performing image detection to detect a ball launched at expected timings based on the training program).

Figure 9:
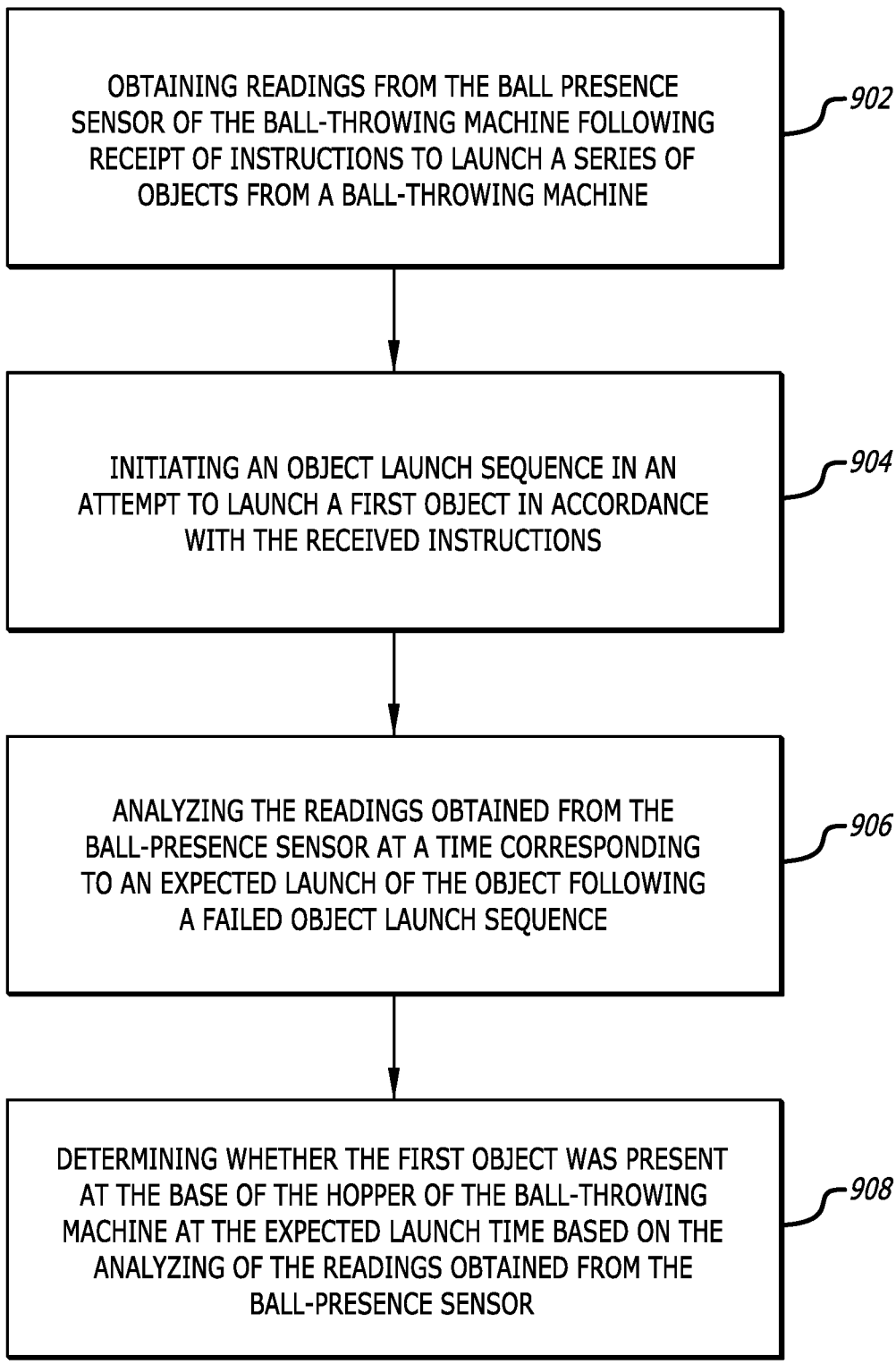
FIG. 9 is block diagram of a fifth computerized method of the ball-throwing machine of FIG. 1 according to some embodiments.

FIG. 9 is a block diagram of a computerized method 900 that, according to some embodiments, includes all or any subset of the following actions, operations, or processes. Each block illustrated in FIG. 9 represents an operation of the method 900 performed by a ball-throwing machine disclosed herein, and typically as a result of execution logic of the ball-throwing machine. The method 900 may include obtaining readings from the ball presence sensor of the ball-throwing machine following receipt of instructions to launch a series of objects from a ball-throwing machine (block 902). In some embodiments of the method 900, ball presence sensor is an optical sensor configured to detect a light reflected off an external surface of an object of the series of objects. The method 900 may further include initiating an object launch sequence in an attempt to launch a first object in accordance with the received instructions (block 904). The method 900 may further include analyzing the readings obtained from the ball-presence sensor at a time corresponding to an expected launch of the object following a failed object launch sequence (block 906). The method 900 may further include determining whether the first object was present at the base of the hopper of the ball-throwing machine at the expected launch time based on the analyzing of the readings obtained from the ball-presence sensor (block 908).

FIG. 10 illustrates a rear perspective view of the ball-throwing machine 100 with the hopper 126 removed. The ball-throwing machine 100 includes an interface module 1000 having various components to enable the ball-throwing machine 100 to be operated by the user and/or external devices. An operator interface portion of the interface module 1000 may include an on/off switch 1002, such a push button switch, for example. The operator interface portion may further include a number of status indicators 1014, including visual status indicators, such as LEDs, for example. The status indicators 1014 may provide a notification to the user in accordance with normal and/or abnormal operation such as discussed above in relation to the one or more sensors. The status indicators 1014 may provide other notifications or alerts, such a lower battery condition for example.

The interface module 1000 may further include various connectors to enable the ball-throwing machine 100 to interact with external devices. The connectors or ports may include, for example, a 9-pin serial port 1008, a USB-C connector 1006, a charging port 1004 (e.g., configured to receive a M12 4-pin connector), and/or an RJ45 port (ethernet) connector 1010.

The 9-pin serial port connector 1008 enables the ball-throwing machine 100 to be hard wired to the remote controller 80 and/or other devices, such as sensors configured to detect balls 90 in the hopper 126, an emergency stop system, or a ball return system, for example. The RJ45 port (ethernet) connector 1010 is connected directly to a port on the CCA 300 which enables the ball-throwing machine 100 to communicate over a wired network if and when a wired communication is desired. The USB-C connector 1006 enables the ball-throwing machine 100 to charge the remote controller 80, a phone, a tablet, or any other device. In the illustrated embodiment, a charging circuit of the CCA 300 may also be configured to provide charging power including 3 amps at 5 volts.

II. Ball-Throwing Operability Analysis

Some deployments of ball-throwing machines may include sports training facilities or social environments. In the former, a plurality of ball-throwing machines may be deployed within a portion of a larger space, where a portion may be referred to as a bay and a set of bays may be separated from each other and other aspects of the larger space by netting. In the latter (social environment), a ball-throwing machine may similarly be deployed within a bay of a larger space separated by other bays or aspects of the larger space by netting or walls. A trainer or staff member may be trained on initiating training programs in the sports training facilities or gamified programs in the social environment, where the training programs and gamified programs may collectively be referred to herein as "training programs."

As noted above, in some instances, a ball-throwing machine may operate for hours, days, or even months at a time without being assessed for operational issues. For example, a trainer may initiate a series of training programs where a ball-throwing machine is deployed to launch a series of balls. At the end of the facility's operating hours, the trainer may plug the ball-throwing into an electrical outlet (or otherwise charge the battery). This procedure may be repeated day-after-day, until the ball-throwing machine "suddenly" has an operability issue arise. Example operability issues may include worn launch wheels, over-inflated balls, deflated balls, motor issues, loose components of the ball-throwing machine (e.g., screws loosened over time). These operability issues are not easily capable of being observed by the trainer's naked eye. For instance, an extremely deflated ball may be easily noticed but a ball that is slightly deflated would not be visibly detectable with a naked eye. "Slightly deflated" may refer to, e.g., 10-20% deflated compared to a preferred inflation, where the pressure is measured in pounds per square inch (PSI), where the International Federation of Association Football (FIFA) requires a PSI between 8.5-16.5 PSI. A slightly deflated ball may impact operability of the ball-throwing machine by affecting the accuracy of the launch by not launching at the proper speed, direction, spin, etc., and may affect the operation of the motor by drawing an alternative amount of current to spin the launch wheels at the required speed than would otherwise be required. As another example, a loose component within the ball-throwing machine may not be visibly detectable by a trainer but may result in operational issues. For example, the loose component may be dislodged and fall into a space within the ball-throwing machine that may interfere with a ball launch and damage the ball or the ball-throwing machine. In some embodiments, as the component becomes loose, it may begin to rattle during operation of the ball-throwing machine, where the rattle is undetectable by a human ear, especially in a large space with many ball-machines operating simultaneously and players training. However, such a rattle may be detectable by a microphone recording the sounds of the ball-throwing machine during operation. Similarly, the progression of operations that are performed for each ball-launch may generate a similar noise pattern (signature) each launch and/or may follow a scripted timing.

Through the methods described herein, a trainer or other staff member may be alerted to anomalous behavior or otherwise confirm normal behavior through monitoring and analysis of sensor data collected during operation of a ball-throwing machine. Additionally, methods described herein may either take automatic corrective or remedial action in response to an automated determination on the operability of the ball-throwing machine, where the determination may be based on an automated analysis of a signature generated from obtained sensor data and/or deployment of a machine learning/artificial intelligence technique. Therefore, several practical applications of the inventive concepts will be detailed further below including identifying improper mechanical operation of a ball-throwing machine, identifying the lack of an available ball immediately preceding a launch sequence, identifying one or more deflated or over-inflated balls, identifying improper timing of operations comprising a launch sequence, identifying loose components of the ball-throwing machine, instructing a trainer or staff member to take a particular remedial action, and/or automatically taking a particular remedial action. Other practical applications will either be discussed throughout and/or will be apparent to those of ordinary skill in the art.

Currently, there is no automatic monitoring of a ball-throwing machine's operability status and determination of whether the status is normal or anomalous. Thus, is the current technical field of ball-throwing machines, methods and systems for determining when these complex, technical machines are operating anomalously are needed. As described herein, a ball-throwing machine includes specific and particular data sensors configured to obtain specific data pertaining to the operability of the ball-throwing machine. Further, detailed methods are disclosed for generating signatures from sensor data that may be compared to signatures of known normal and/or anomalous behavior in view of the general operability and in particular situations, such as a launch sequence. Additional embodiments disclosed pertain to the generation (training) and deployment of a machine learning model configured predict the operability status of a ball-throwing machine from the sensor data acquired during operation of the ball-throwing machine.

Thus, embodiments disclosed herein specifically improve the technical operation of current ball-throwing machines by ensuring the ball-throwing machine is operating as expected, identifying operability issues that are not identified by the naked human eye (or ear), identifying trends in operability status indicating a likelihood of an imminent operability issue, and providing an alert to a trainer or a staff member of the operability status, issue or trend, and finally, optionally, providing instructions on remedial actions or automatically taking such remedial actions. Thus, the disclosure enables more accurate operate of the ball-throwing machine and reduces the likelihood that a ball-throwing machine will suffer a permanent or significant failure.

As will be described below in detail, methods provided herein improve the technical field of ball-throwing machines, especially "smart" ball-throwing machines that are coupled to a network and exchanged data with logic operating on a networking device (e.g., a remote server or other cloud computing resources). In some embodiments, a ball-throwing machine may include one or more sensors integrated therein, e.g., a microphone or a vibration sensor disposed on a circuit board of the ball-throwing machine. The sensors may acquire data during operation of the ball-throwing machine and logic, either operating (e.g., being executed by one or more processors) on the circuit board of the ball-throwing machine and/or on logic communicatively coupled to the ball-throwing machine. In some instances, the logic generates one or more signatures from the sensor data and compares the signatures to signatures of known operability statuses, e.g., normal or anomalous operating behavior. In other instances, the logic deploys a machine learning (ML) model providing the sensor data as input in order to obtain a prediction or classification of the operating status of the ball-throwing machine. In some instances, both modalities may be utilized. For example, where one modality (signature comparison or ML analysis) may hold a greater weight in the determination or where one modality may be used to confirm the other modality such that when the modalities agree the status is provided with an indication of a high confidence and when the modalities disagree, the status is provided with an indication of a lower confidence.

1. System Architecture

Referring now to FIG. 11, a block diagram illustrating a first system architecture of a ball-throwing machine coupled to data processing system operating within a networked environment is shown in accordance with some embodiments. The networked environment 110 is shown to include a ball-throwing machine 100, a remote 80, and a network 1102. Additionally, two instances of a data processing system $1104_{1-2}$ (either instance may be referred to as "data processing system 1104") are shown as operating on the network 1102 and the remote 80, respectively. In some embodiments, although not shown for purposes of simplicity, an instance of the data processing system may operate on the ball-throwing machine 100.

As discussed above, the ball-throwing machine 102 is configured to deliver a ball, such as a soccer ball or a specialized soccer-type ball to a user, the delivery of which is typically done in accordance with a training program. As further discussed above, a training program may be selected by a user, a trainer, or other staff member and transmitted to the ball-throwing machine 100, the execution of which causes initiation of operations performed by the ball-throwing machine 100 to launch a series of balls. As shown in FIG. 11, the selection of the training program may occur at the remote 80 and transmitted to the ball-throwing machine 11, e.g., via a wired or wireless connection. In other embodiments, the selection of the training program may occur at a network device that is communicatively coupled to the ball-throwing machine via the network 1102 such that the selection is transmitted therethrough.

Upon initiation of operations that cause the launching of balls in accordance with the training program, a set of sensors may begin collecting data indicating operability of the ball-throwing machine. The set of sensors may include sensors disposed on the ball-throwing machine 100 such as the ball sensor 211, the microphone 320, the accelerometer 330, etc. As discussed in detail below, the data processing system ("system") 1104 is configured to obtain the sensor data, generate one or more signatures from the sensor data and/or analyze the sensor data to determine an operability status of the ball-throwing machine and/or particular components of the ball-throwing machine. The analyses of the sensor data may include comparisons with predetermined signatures generated following deployment of a ball-throwing machine during known operating conditions (e.g., known to be proper or improper in order to generate signatures for normal operation and for abnormal operation including known abnormal states such as worn launch wheels, over- or under-inflated balls, no balls present at the solenoid, etc.). Additionally, or in the alternative, the analyses may include machine learning techniques such as processing of the sensor data by a trained machine learning model or a neural network.

As will be discussed below, the system 1104 is configured to determine an operability status of the ball-throwing machine or a component thereof and/or predict a future operability status of the ball-throwing machine. Based on the determination or prediction, the system 1104 may generate an alert to a user, a trainer, or other staff member, generate a log entry that is recorded for later viewing, automatically shut off the ball-throwing machine, automatically adjust the training program (e.g., reduce speed of balls, pause training program to allow balls to be placed in the hopper, etc.), and/or provide a remediation recommendation or instruction for remediating an error associated with abnormal operation.

Referring now to FIG. 12, a logic diagram illustrating a logic modules of the data processing system ("system") of FIG. 11 stored on non-transitory storage and configured to be executed by one or more processors is shown in accordance with some embodiments. The computing environment 1200 shown to include processors 1202, a communication 1204, and non-transitory computer-readable medium (storage) 1206 may represent a portion of a network device, e.g., a server device, a mobile phone, a tablet, or other computing device. In other embodiments, the computing environment 1200 may represent a cloud-computing environment, which may be understood to comprise hosted services delivered via a network, such as the internet. In some instances, the computing environment 1200 may refer to cloud computing services including servers, storage, and virtualized compute resources hosted by a third-party, such as Amazon Web Services, Inc. (AWS), where the computing environment 1200 is configured for processing within a virtualized computing environment, e.g., a virtual machine (VM).

The system 1104 is shown as being stored on the storage 1206 and includes logic modules of a sensor collections logic 1208, a signature generation logic 1210, a model training logic 1212, a sensor data evaluation logic 1214, an alert generation logic 1220, and a remediation logic 1222. The sensor data evaluation logic 1214 includes sub-logic modules of a signature evaluation logic 1216 and a model evaluation logic 1217. The system 1104 is shown to include a signature/model storage (e.g., database) 1218. Further, the storage 1206 may also have stored thereon the communication interface logic 1224.

The sensor collection logic 1208, when executed by the processors 1202, is configured to perform operations of receiving the acquired sensor data from each of the one or sensors disposed on a ball-throwing machine such as the ball-throwing machine 100. The sensor collection logic 1208 may obtain the sensor data in any of a number of formats as individual sensors acquire data in various formats (e.g., audio data by a microphone and numerical data representing a level of vibration). Additionally, the sensor collection logic 1208 is configured to obtain current/power usage readings from the motor of the ball-throwing machine. The current/power usage data will be included as part of the sensor data discussed herein.

The signature generation logic 1210, when executed by the processors 1202, is configured to perform operations of generating signatures from the sensor data. Detail as to the signature generation process is provided below, for example, with respect to FIGS. 13A-13B. Following generation of a signature, the signature may be stored in the signature/model storage 1218.

The model training logic 1212, when executed by the processors 1202, is configured to perform operations of training a machine learning model or a neural network each configured to analyze the sensor data and/or signatures to predict or classify the operating status of the ball-throwing machine. Detail as to the training of the machine learning models and neural networks is included below. Following training or generation of a machine learning model or neural networks, each may be stored in the signature/model storage 1218.

The sensor data evaluation logic 1214, when executed by the processors 1202, is configured to perform operations involving signature analysis and/or machine learning techniques to evaluate sensor data in order to classify a current operating status of the ball-throwing machine, predict a current or future operating status of the ball-throwing machines, classify or predict an operating status of a particular component of the ball-throwing machine, etc. The sensor data evaluation logic 1214 may include sub-modules signature evaluation logic 1216 and the model evaluation logic 1217. The signature evaluation logic 1216 may be configured to obtain acquired sensor data from the sensor collection logic 1208 and one or more signatures from the signature/model storage 1218, and perform comparisons between the acquired sensor data and one or more signatures. As noted herein, the comparisons mark in some embodiments, seek to detect an identical match. However, in other embodiments, the comparisons may seek to identify a percentage of a match such that the percentage may be compared to a threshold, where satisfying the threshold comparison indicates a match (e.g., where the threshold may be 75%, 80%, 90%, etc.). The threshold may vary according to the specific signature such that a first signature (e.g., derived from and compared to audio data) may be paired with a first threshold (e.g., 70%) and a second signature (e.g., derived from and compared to vibration data) may be paired with a second threshold (e.g., 80%). It should be understood that these examples are not limiting and only illustrative. The comparisons may indicate that a particular action occurred or did not occur at the time that the sensor data was collected (stated differently, the signature comparisons, and optionally threshold comparisons, may indicate that the sensor data is representative of a particular action such as a ball-launch sequence or the activation of a solenoid of a ball-throwing machine). Thus, the signature comparisons may be used to determine a sequence of actions that occurred during deployment of a ball-throwing machine. By comparing (i) a sequence or series of actions detected according to the signature comparisons to (ii) the training program, the sensor data evaluation logic 1214 may determine whether the ball-throwing machine is operating normally or abnormally. For instance, when the actions of the training program align with the detected actions according to the signature comparisons for the same actions, the sensor data evaluation logic 1214 determines that the ball-throwing machine is operating normally (e.g., the training program instructed that ten balls were to be launched and the sensor data indicated ten balls were launched according to the signature comparisons). However, the signature comparison results are inconsistent with the training program, the sensor evaluation logic 1214 determines the ball-throwing machine is operating abnormally. Depending on the percentage that the results of the signature comparisons match with the training program, the sensor data evaluation logic 1214 may indicate a percentage at which the ball-throwing machine is operating normally or abnormally. Further, in some embodiments, the sensor data evaluation logic 1214 may indicate that particular components are operating normally while others are operating abnormally. For instance, when two of ten actions are identified by the signature evaluation logic 1214 as either having not occurred or having occurred outside of a threshold time window (e.g., occurred late), the component(s) responsible for such actions may be indicated as operating abnormally while the other components may be indicated as operating normally.

Additionally, the model evaluation logic 1217 may be specifically configured to obtain acquired sensor data and one or more models (machine learning models and/or neural networks, collectively) from the sensor collection logic 1208 and the signature/model storage 1218, respectively, and apply the model to the acquired sensor (e.g., sensor data is provided as input to the model). The application of the model to the sensor data results in a classification or a prediction of a future operating status. In some embodiments, the trained machine learning models may be configured to classify a component or the ball-throwing machine as operating normally or abnormally. Alternatively or in addition, the trained machine learning models may be configured to extrapolate a current operating status of various components in order to predict a future operating status of one or more components or of the ball-throwing machine generally.

Detail as to some embodiments of the training and deployment of some machine learning techniques are discussed below. Various machine learning models may be trained using historical data (e.g., sensor data during deployment of the ball-throwing machine under known operating conditions, and or previously collected sensor data that has been labeled), where the machine learning models are configured to classify or predict an operating status of the ball-throwing machine or a component thereof. Example machine learning algorithms that may be used in generating a trained machine learning model include, but are not limited or restricted to, classification algorithms such as logistic regression, decision tree, random forest or gradient boosting based classifiers, kNN (k-nearest neighborhood), etc. In other embodiments, the machine learning techniques may include training and deployment of one or more neural networks, the training and deployment of which are also discussed below. Additionally, in some embodiments, the sensor evaluation logic 1214 may provide results as discussed above to the remediation logic 1222, discussed below.

The alert generation logic 1220, when executed by the processors 1202, is configured to perform operations of generating alerts, notifications, graphical user interfaces (e.g., dashboards), etc. The alerts or notifications may be provided to one or more users in a variety of manners such as an email, a text message, a visual alert displayed on a graphical user interface, a change in status of a light (e.g., light emitting diode (LED)) of the ball-throwing machine, etc. In some embodiments, the alert generation logic 1220 may be configured to compare results of evaluations performed but eh sensor data evaluation logic 1214 against one or more thresholds, where based on the threshold comparison, an alert may be generated. The threshold comparisons may be those discussed above. It should be understood, regardless of whether a threshold comparison is performed by the sensor data evaluation logic 1214 or the alert generation logic 1220, when the results of evaluations of the sensor data evaluation logic 1214 do not satisfy the threshold, no action needs to be taken, e.g., an indication of normal operating behavior need not occur. However, in other instances, when a threshold comparison indicates normal operating behavior, a status indicator may be provided to one or more users (e.g., an indication within a dedicated application may maintain a "normal operating behavior" indicator such as a green check mark or other symbol next to the ball-throwing machine within a listing of the ball-throwing machines. Alternatively, or in addition, a status indicator (e.g., an illuminated LED on the ball-throwing machine) may maintain an indication of normal operating behavior (e.g., illuminated as green or another predetermined color).

The remediation logic 1222, when executed by the processors 1202, is configured to perform operations of determine a remedial action to be taken in response to the evaluations performed by the sensor data evaluation logic 1214. For example, upon the sensor data evaluation logic 1214 determining that sensor data indicates a launch wheel is worn, the remediation logic 1222 may provide a particular action to be taken to the alert generation logic 1220, which is then included within an alert or notification. The example, the indication of a remedial action may include text instructions such as "Change Launch Wheels" or may provide a code that a trainer or staff member may correlate with remedial instructions. In other instances, the remediation logic 1222 may initiate a particular action automatically. For example, when the sensor data evaluation logic 1214 determines that the current/power usage has exceeded a particular threshold indicating the motor is being overworked, the remediation logic 1222 may automatically initiate a shutdown of the ball-throwing machine in order to enable the motor to cool. The remediation logic 1222 may obtain the remedial action through a look-up or query to a database (which may be included as part of the remediation logic 1222 or stored in a separate data store, not shown) using the results of the sensor data evaluation logic 1214 or threshold comparison performed by the alert generation logic 1220 as a key. Other examples of remedial actions will be described below, and others will be apparent to one of ordinary skill in the art based on the disclosure provided herein.

2. System Methodologies

Referring to FIG. 13, a flow diagram illustrating operations of a method for identifying normal or anomalous behavior of a ball-throwing machine through signature analysis is shown in accordance with some embodiments. FIG. 13 illustrates the method 1300 of identifying normal or anomalous behavior of a ball-throwing machine, such as the ball-throwing machine 100 disclosed herein. Each block of FIG. 13 represents an operation within the method 1300 where it should be understood that one or more of the operations illustrated in the method 1300 are optional.

The method 1300 begins when a ball-throwing machine is deployed under known operating conditions according to a selected training program (block 1302). The known operating conditions may any known operating condition such as normal operating conditions where all components of the ball-throwing machine are operating properly. Other known operating conditions may include operating where one or more components are known to be operating improperly (e.g., known worn launch wheels, operating without balls in the hopper, operating with over-inflated or deflated (under-inflated) balls, etc.). Before, during, and/or after deployment of the ball-throwing machine according to the training program, sensor data is collected from the one or more sensors operating as components of the ball-throwing machine (block 1304). Thus, sensor data may be collected at various stages of operation/deployment. It should be understood that the operations of blocks 1302-1304 may be repeated numerous times where the ball-throwing machine is deployed under various operating wide-range of sensor data corresponding to the known operating conditions.

Following collection of the sensor data, the sensor data may be analyzed in view of the selected training program to determine variability in the sensor data (block 1306). Deployment of the ball-throwing machine may generate training program data that may associate a time stamp with the training program and with aspects of the training program. For example, a timestamp may be associated with a start/end of the training program such that the duration of the training program is associated with a timestamp, e.g., measured in seconds or milliseconds. Further, each action within the training program may be associated with a noted timestamp, such as each ball-launch sequence and each aspect of a ball-launch sequence. A ball-launch sequence may refer to a determination as to the presence of a ball at the base of the hopper, and a release of a ball stop through activation of a solenoid as discussed above.

The analysis of the sensor data in view of the selected training program may include comparing timestamps of known actions (e.g., activation of a solenoid) with timestamps of the sensor data, which results in the generation of a pairing of a known activity and one or more sensor data values (e.g., labeling a specific timeframe of sensor data as a known activity). As one example, the activation of the solenoid causes a unique and identifiable noise. The analysis of the sensor data may thus generate a pairing of audio data (e.g., 1-2 seconds) with a label of a solenoid activation. The pairing of a known activity and a specific duration of sensor data represents a first signature (block 1308). As discussed above, a signature may represent a pairing of a single source of sensor data and a single known activity. Other signatures may represent a pairing of a single source of sensor data over a duration covering multiple known activities (e.g., an entire launch sequence or training program). Other signatures may represent a pairing of multiple sources of sensor data and a single known activity. Yet other signatures may represent a pairing of multiple sources of sensor data over a duration covering multiple known activities. As noted above, generated signatures may be stored in a signature/model storage for comparison with signatures generated from subsequently collected sensor data of a ball-throwing machine operating under unknown conditions. The operations of blocks 1306-1308 are illustrated in FIG. 13B and discussed below.

A ball-throwing machine may then be deployed under unknown operating conditions, e.g., standard operation in which a trainer or staff member powers on the machine in its ordinary course of deployment and the ball-throwing machine executing instructions corresponding to the training program resulting the launch of a plurality of balls at specified speeds, directions, angles, timings, etc. Sensor data is collected during deployment of the ball-throwing machine operating under unknown operating conditions, where one or more signatures are generated for the sensor data in view of the training program. The recently generated signatures are then compared to the signatures generated under known operating conditions to identify normal or anomalous behavior of the ball-throwing machine (block 1310). The signature comparisons may result in an indication that the recently generated signature is a direct match of a particular signature or an indication of a level of similarity (e.g., a percentage match). When results of the signature comparisons indicate a threshold match to one or more stored signatures, a threshold comparison may be performed, where the result of the threshold comparison indicates whether to note a sufficient match between the recently generated and stored signatures. When a direct match or a sufficient match based on a threshold comparison is determined to exist, a record may be created indicating the match and, thus, the activity that was determined by the system 1104 to have occurred or the operating status of the ball-throwing machine. In some instances, a match (direct or sufficient) with one or more signatures may indicate anomalous behavior (e.g., detection of particular extraneous noises or a lack of solenoid activations).

Additionally, each training program is associated with a set of actions, which may be predetermined and known in advance of the initiation or may be determined dynamically during the training program, e.g., where the training program progresses based on factors such as trainer input (to increase or decrease difficulty) or user accuracy (returning launched balls to an indicated goal or location with at least a threshold amount of accuracy). In either instance, as the training program progress, training program data (e.g., a record) is generated of the instructed actions and timestamps corresponding thereto. Thus, in some embodiments, an analysis may be performed that compares the signatures generated from sensor data obtained during a training program, the instructed actions, and the corresponding timestamps of each. Such an analysis results in an indication as to whether the ball-throwing machine is operating such that it generates sensor data indicative of and consistent with the instructed (expected) actions. Such an analysis may include determining how closely the timestamps of the expected actions matched with the timestamps of signatures of sensor data (e.g., did a ball-launch sequence begin within a predetermined timeframe of its expected beginning, such as 5 milliseconds). Additionally, the analysis may include determining how many actions were actually performed as expected within a threshold time frame. Alerts may be generated at any level of inconsistency (and may set by a trainer or staff member). For instance, an alert may be generated when an expected action did not occur within a predetermined time frame (e.g., the action occurred but occurred too late such as more than 5 milliseconds) or only when the expected action did not occur at all. Alternatively, or additionally, alerts may be generated when a threshold number of actions occurred late or did not occur. Further, a determination may be made on the operating status of the ball-throwing machine such as operating normally or abnormally (e.g., anomalous or abnormal behavior detected) based on a percentage of actions that did not occur or a percentage of actions that occurred outside of a predetermine timeframe from the expected time. Other metrics may be analyzed such as duration of certain actions.

Figure 13A:
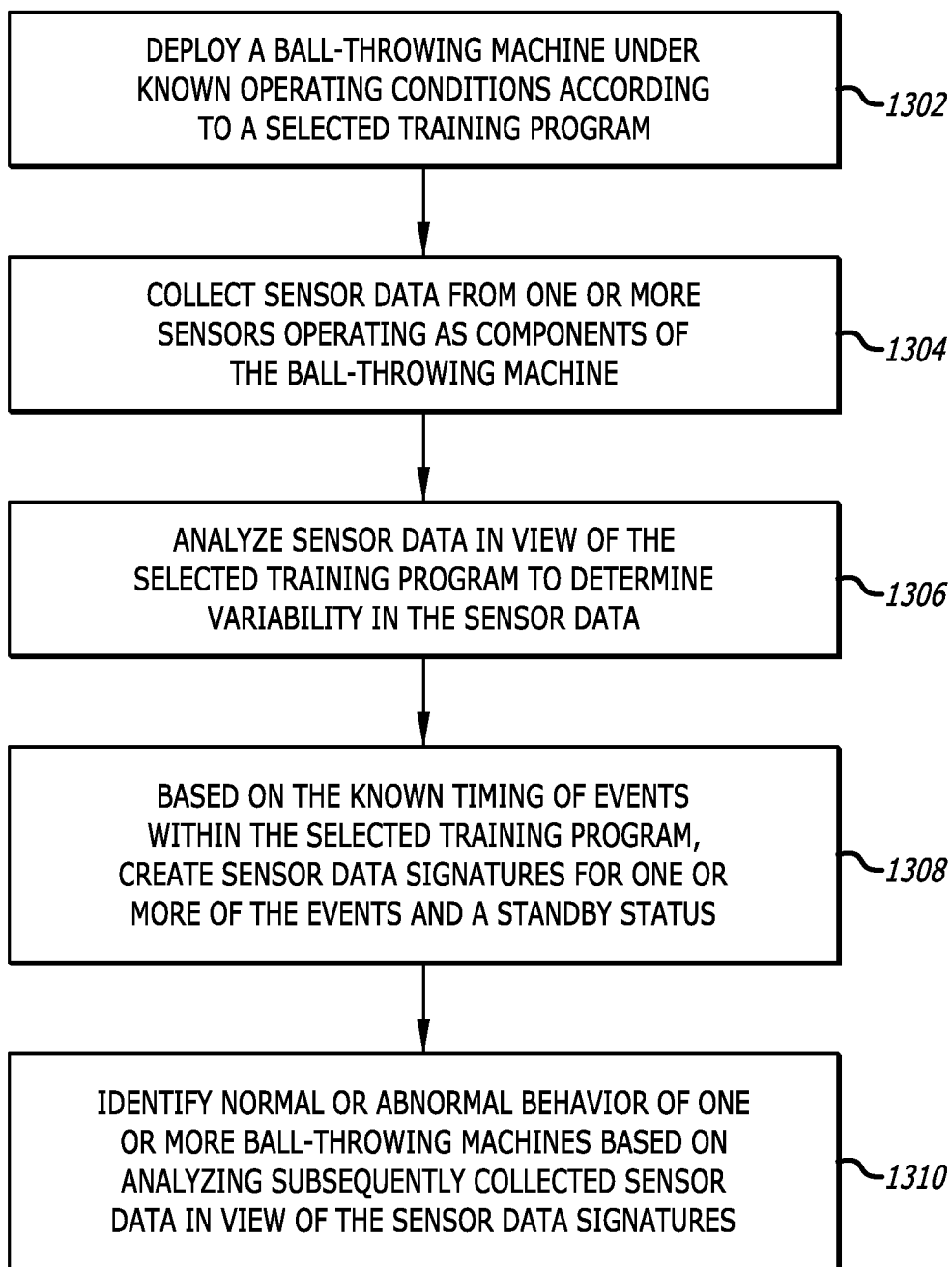
FIG. 13A is a flow diagram illustrating operations of a method for identifying normal or anomalous behavior of a ball-throwing machine through signature analysis in accordance with some embodiments.
Figure 13B:
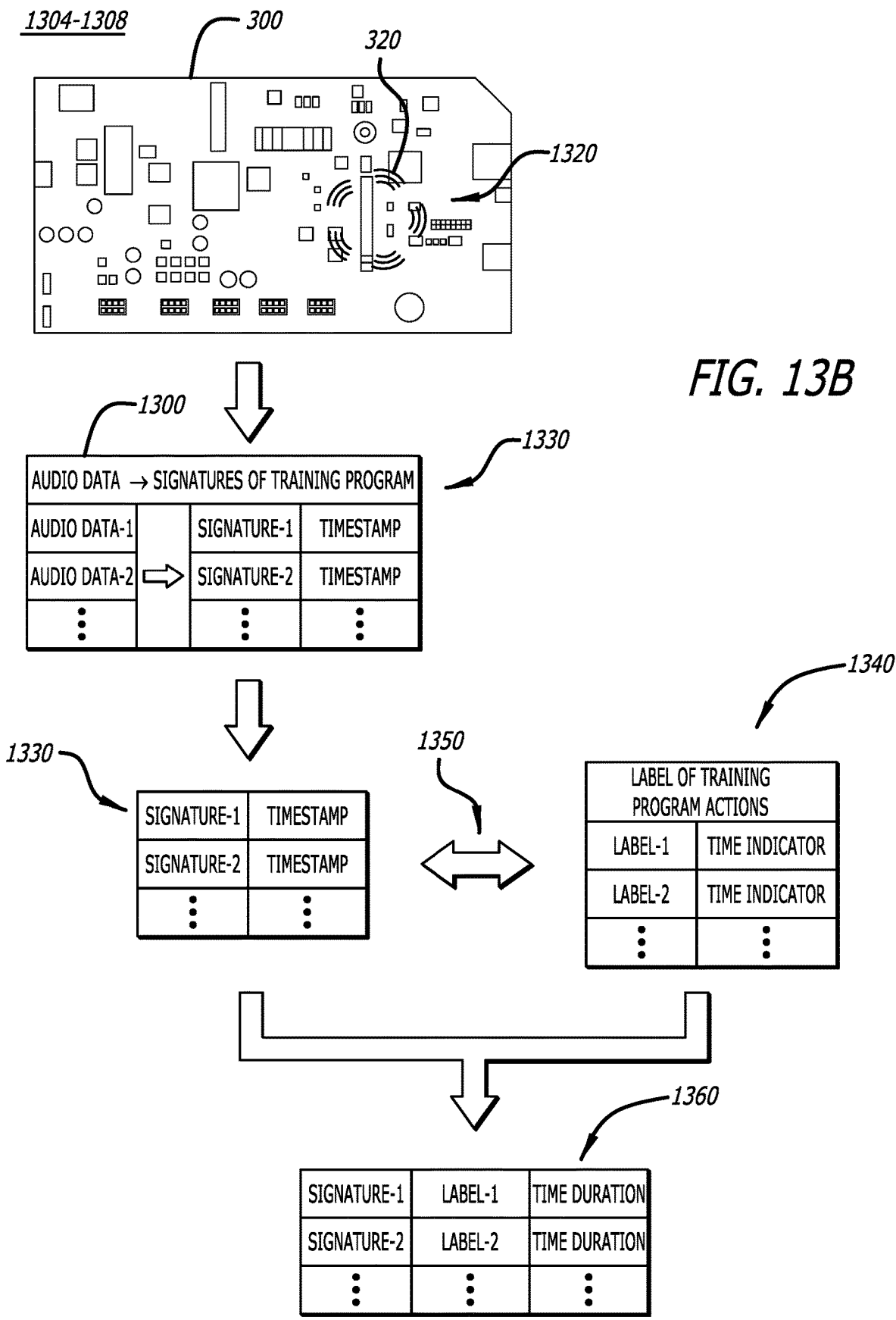
FIG. 13B is an illustrative flow of operations of the method 1300 of FIG. 13A including analyzing sensor data and generating sensor data signatures in accordance with some embodiments.

Referring now to FIG. 13B, an illustrative flow of operations of the method 1300 of FIG. 13A including analyzing sensor data and generating sensor data signatures is shown in accordance with some embodiments. In particular, operations primarily of blocks 1304-1308 are shown. In summary of the discussion above, block 1304 includes operations of collecting sensor data from one or more sensors operating as components of the ball-throwing machine and block 1306 includes operations of analyzing sensor data in view of the selected training program to determine variability in sensor data. Block 1308 includes operations of creating sensor data signatures for one or more of the events and a standby status based on the known timing of events from the training program.

FIG. 13B begins illustrating the operations of blocks 1304-1308 with an illustration of a sensor component, e.g., the microphone 320, collecting audio data 1320. Consistent with FIG. 3, the microphone 320 is shown as being disposed on a control unit 300, which functions to operate a ball-throwing machine. As noted above, the microphone 320 may begin collecting audio data upon initiation of operations to carry out a training program. For example, as the ball-throwing machine is powered-on and receives a selection of a training program, power is provided to a motor of the ball-throwing machine causing launch wheels of the ball-throwing machine to spin. The noise created by the motor and the spinning of the launch wheels may be at least a portion of the audio data collected by the microphone 320.

Next, the audio data 1320 is analyzed in view of the selected training program. For example, the audio data 1320 may be parsed into segments, "Audio Data—1," "Audio Data—2," etc., and converted into signatures that are paired with timestamps of the audio data segments. In some embodiments, the conversion may just include creating the pairing of the audio data segments with the timestamps (e.g., indicating a beginning of the segment or a range such as a start and end time of the segment). In other embodiments, the conversion may include reformatting the audio data from a first format (e.g., waveform audio file (WAV) to a second format (e.g., MPEG-1 Audio Layer III ("MP3")). The conversion may result in the table 1330, which may be reduced to the table 1335, comprising pairings of signatures and timestamps. The table 1335 may be correlated with entries of the table 1340, which comprises pairings of labels of training program actions and expected timings of those actions. For example, the timings of those actions may include start times for each action relative to a beginning of the training program or a time segment (duration) relative to the beginning of the training program.

The pairings of the table 1340 are predetermined and known in advance based on the selected training program. More specifically, the selected training program includes a known set of actions and timings for each action, e.g., twenty ball launches, where each ball-launch sequence takes 3 seconds, with a fifteen second standby period in between each ball-launch sequence. The correlation 1350 of the tables 1335, 1340 may include comparing the timestamps of table 1335 with the time indicators (time stamps or time durations) of table 1340 to determine which label of table 1340 corresponds to each signature of table 1335 by aligning time indicators. Thus, as the ball-throwing machine is operating under known conditions when generating signatures, the table 1360 provides an indication as to the signatures and signature patterns for training programs when the ball-throwing machine is operating properly and, in some instances, when the ball-throwing machine is operating improperly. With respect to the latter, signatures may be generated indicating how a training program is performed under certain improper operating conditions such as having worn wheels or missing one or more balls. Thus, the correlation pairs a signature with a label and a time duration (or other time indicator such as a timestamp relative to the beginning of the selected training program). The pairings of table 1360 may then be recorded on non-transitory computer-readable medium for future access and comparison with future sensor data collected when a ball-throwing machine is operating under unknown conditions in order to identify the actions (or inactions) performed by a ball-throwing machine enabling the system 1104 to identify normal or abnormal behavior.

a. Example Use Case

As an example of an example use case, the system 1104 may perform a computerized method for determining an operability status of a ball-throwing machine. Operations of the computerized method may include obtaining data from the one or more operational sensors collected during operation of the ball-throwing machine, and determining the operability status of the ball-throwing machine from the data collected by the one or more operational sensors. In such an example, the one or more operational sensors may be disposed on the ball-throwing machine and the operation of the ball-throwing machine includes performance of a series of ball-launch sequences resulting in launching a series of balls in accordance with a training program. The ball-throwing machine may be comprised of one or more launch wheels configured to launch one or more balls by imparting motion thereto, a frame to which the one or more launch wheels are coupled, and a control circuit configured to control the one or more launch wheels.

In some implementations of the use case, the performance of a first ball-launch sequence includes a motor of the ball-throwing machine spinning the one or more launch wheels at a spin rate configured to impart motion to a first ball at a specified speed. Additionally, the one or more operational sensors may include at least one of an accelerometer configured to detect vibration data, a microphone configured to detect audio data, a temperature sensor configured to detect ambient temperature of the control circuit, or a current sensor configured to detect current drawn by at least a first launch wheel. In some implementations, determining the operability status of the ball-throwing machine includes analyzing the collected data resulting in detection of a variability in the collected data, and detecting whether the variability in the collected data is consistent with an expected variability based on the training program.

In some instances, determining the operability status of the ball-throwing machine includes parsing the collected data into segments based on a variability in the collected data. In yet further instances, determining the operability status of the ball-throwing machine further includes comparing the segments of the collected data to signatures of known actions comprising the training program, and detecting whether a time-based ordering of the segments is consistent with an expected set of actions based on the training program. In some implementations, the operations further include generating an alert indicating that the ball-throwing machine is operating abnormally, and causing display of the alert on a display of a network device.

b. Signature Generation

Figure 14:
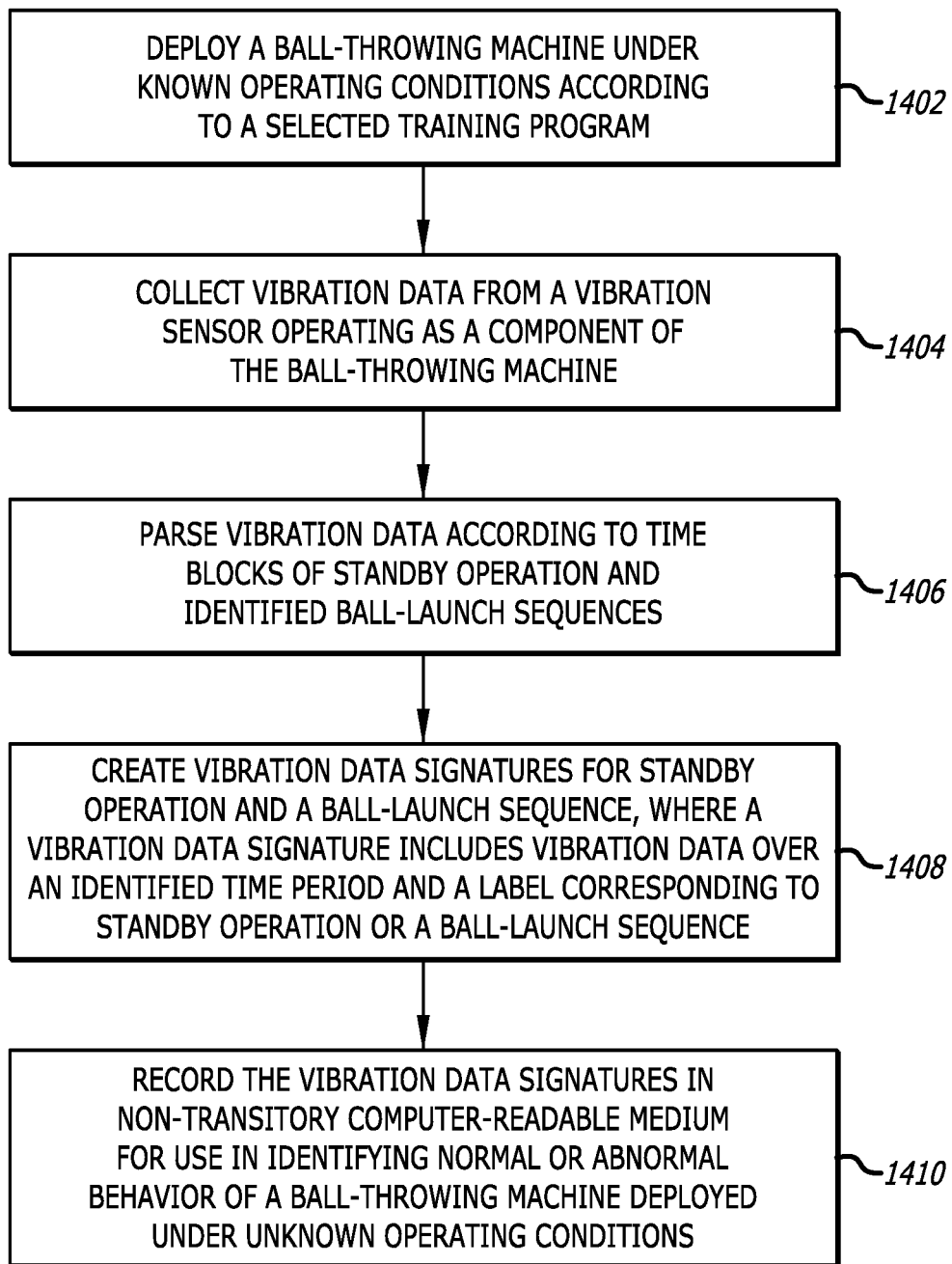
FIG. 14 is a flow diagram illustrating operations of an exemplary method for generation of a signature for sensor data during operation of a ball-throwing machine from a first sensor (vibration sensor) in accordance with some embodiments.

Referring now to FIG. 14, a flow diagram illustrating operations of an exemplary method for generation of a signature for sensor data during operation of a ball-throwing machine from a first sensor (vibration sensor) is shown in accordance with some embodiments. Each block illustrated in FIG. 14 represents an operation of the method 1400 performed by the system 1100. It should be understood that although the method 1400 specifies collection of vibration data, the underlying principles for generating a signature apply equally to other sensor data. Additionally, some operations of the method 1400 may be optional. The method 1400 begins as a ball-throwing machine is deployed under known operating conditions and according to a selected training program (block 1402). Vibration data is collected from a vibration sensor operating as a component of the ball-throwing machine (block 1404). As discussed above, the sensor collection logic 1208 may acquire the vibration data. For instance, the vibration sensor may be communicatively coupled to a processor of the ball-throwing machine, which provides the vibration data to the sensor collection logic 1208. In some embodiments, the sensor collection logic 1208 operates on the ball-throwing machine (e.g., on a circuit board thereof) or in cloud computing or other networked services. In either instance, the vibration data is provided to the signature generation logic 1210, which parses the vibration data according to time blocks of standby operation and identified ball-launch sequences (block 1406). The term standby operation may refer to periods of deployment of the ball-throwing machine that are in between ball-launch sequences (or prior to the initial ball-launch sequence). A ball-launch sequence may be comprised of a series of actions performed by multiple components.

Vibration data signatures are then created for standby operation and a ball-launch sequence, where a vibration data signature includes vibration data over an identified time period and a label corresponding to standby operation of a ball-launch sequence (block 1408). A ball-launch sequence may be comprised of multiple actions such that a signature may be generated for the entire ball-launch sequence and/or one or more of the actions individually. Thus, from vibration data collected over the time period spanning a ball-launch sequence, a plurality of vibration signatures may be generated. The vibration data signatures may then be recorded in non-transitory computer-readable medium (e.g., the signature/model storage 1218 of FIG. 12) for use in identifying normal or abnormal operations or behaviors of the ball-throwing machine deployed under unknown operation conditions (block 1410).

b. Machine Learning/Artificial Intelligence Deployment

The model evaluation logic 1217 is configured to perform various analytics on received sensor data. As illustrated in further detail in FIGS. 15-16, the model evaluation logic 1217 may perform operations categorized as one or more artificial intelligence techniques. For example, the model training logic 1213 may perform operations to generate or train a machine learning model or neural network and the model evaluation logic 1217 may perform operations to implement the trained machine learning (ML) model or the neural network.

(i). Machine Learning Models

More specifically, the model training logic 1212 may perform operations of generating a trained machine learning (ML) model, where generation is performed generally through processing of historical data with a ML algorithm. The trained ML model may be specifically configured to receive as input any of sensor discussed herein. As should be understood, machine learning is a subset of artificial intelligence (AI) that involves the development of algorithms and models that enable computers to learn and make predictions or decisions based on data, without being explicitly programmed. In essence, the goal of machine learning is to allow computers to improve their performance on a task over time by automatically learning from examples.

The implementation of machine learning by the model training logic 1212 and the model evaluation logic 1217 may include the operations of data collection, data preprocessing, feature engineering, model training, loss function, optimization, validation/testing, hyperparameter tuning, and deployment/inference. More specifically, data collection includes obtaining a dataset that contains examples relevant to the task to be learned by the machine learning model. The dataset includes input features (also known as attributes) and corresponding target labels (the desired output or outcome). Examples of such may include current values drawn by one or more of the motor wheels, speed of wheel rotation (e.g., revolutions per minute), ambient temperature of circuit board, number of ball launches, detections of ball present at base of hopper, stepper motor movements, number of balls thrown, timing of balls thrown, angle and direction of balls thrown, vibration data, noise data, etc.

As raw data (comprising the dataset) is often messy and may contain noise, missing values, or inconsistencies, data preprocessing operations may involve automated cleaning and transforming of raw data into a usable format. This may include removing outliers, filling in missing values, and scaling features.

Feature engineering includes determination of input features within the dataset that are specific for the task to be learned in order to represent the underlying patterns in the data effectively. Feature engineering involves the selection of the relevant features and, in some instances, the creation of new features to enhance the trained ML model's performance.

Model training includes providing a selected ML algorithm with the prepared dataset (e.g., following preprocessing and including the selected features) such that processing of the prepared dataset by the ML algorithm results in a trained model through adjustment of a model's internal parameters causing a mapping of the input features to the target labels. The ML algorithm utilized for training may be dependent on the task to be solved. The model training logic 1212 may generate one or more trained ML models that are configured to determine one or more of a classification of an operating status of the ball-throwing machine, a classification of an operating status of one or more components of the ball-throwing machine, or a prediction of either. Example ML algorithms may include classification algorithms such as logistic regression, decision tree, random forest or gradient boosting based classifiers, kNN (k-nearest neighborhood), etc.

During the model training process, operations are performed to minimize a loss function (also known as a cost function), which quantifies the error between the model's predictions and the actual target labels. The loss function depends on the ML algorithm utilized in training; for example, mean squared error for regression tasks and cross-entropy for classification tasks. Additional details of minimizing the loss function are described below but as a general summary, the model's internal parameters are updated iteratively using techniques, such as gradient descent, which is a first-order iterative optimization algorithm for finding a local minimum of a differentiable function such that the parameters of the model are adjusted in the direction that reduces the loss function.

Following training, the model's performance is evaluated on data not utilized in training (e.g., data not previously presented to the model). The dataset is usually split into a training set (used for training) and a validation/test set (used for evaluation). The model is provided the validation/test set as input (without labeling) and the resulting prediction/determination is evaluated against the labeling of the validation/test set. Depending on the machine learning algorithms utilized, hyperparameters of the model may be turned following training. Hyperparameters may refer to model configurations that are not learned during training but affect the model's behavior.

Following validation and testing of the model, the model may be deployed to make predictions on new, real-world data (e.g., newly acquired sensor data). During inference, the model processes new input data and generates predictions or decisions based on what it has learned during training.

Although the following subsections provide detail as to training and deployment of a linear regression model and neural network, the disclosure is not limited to these examples. The following is merely intending to be illustrative as to possible artificial intelligence techniques. Additionally, it should be understood that either a linear regression model or a neural network may be used to determine a classification or prediction of an operating status and/or a remedial action to be provided to a trainer or other staff member.

More specifically, classification machine learning algorithms that may be utilized in processing training data to generate a machine learning model configured to classify a current operability status may include logistic regression, K-nearest neighbors (KNN), support vector machines (SVM), decision trees, naïve bayes, K-means clustering, random forest, gaussian process classification, etc. Additionally, predictive machine learning algorithms that may be utilized in processing training data to generate a machine learning model configured to predict a future operability status may include linear regression, ridge and lasso regression, decision trees, random forest, gradient boosting algorithms, time series forecasting, support vector regression (SVR), K-nearest neighbors (KNN), K-means, etc.

(ii). Linear Regression

As one example, the implementation of machine learning by the model training logic 1212 and the model evaluation logic 1217 may include training and deployment of a linear regression machine learning model. Training of a linear regression machine learning model involves finding the best-fitting linear relationship between a set of input features and a target variable. This relationship is represented by the known linear equation of:

$$y = \beta_0 + \beta_1 x_1 + \beta_2 x_2 + \ldots + \beta_n x_n$$

Where y is the target variable to predict, $\beta_0$ is the intercept (y-axis value when all x values are 0), and $\beta_1, \beta_2, \ldots, \beta_n$ are the coefficients for the respective input features. Training a linear regression model results in determining the values of $\beta_0, \beta_1, \beta_2, \ldots, \beta_n$ that minimize the error between the predicted values (y) and the actual target values. This is typically done using a mathematical optimization technique known as least squares regression. In some embodiments, the operations involved in training a linear regression model include data collection, data preprocessing, model initialization, coefficient minimization, and model evaluation.

In more detail, a dataset (training data) is obtained that includes input features ($x_1, x_2, \ldots, x_n$) and the target variable (y). The training data may undergo preprocessing steps including missing value handling, scaling, or normalizing the values. The coefficients ($\beta_0, \beta_1, \beta_2, \ldots, \beta_n$) are initialized such as with a value of 0 or small, random values. Next, the values of the coefficients are determined that minimize a loss function, e.g., the mean squared error (MSE), which is typically performed through the use of the gradient descent algorithm. This is an iterative process including predicting a first value for y ($y_{predict}$) using the initial (current) coefficient values and input features. The error (or loss) between $y_{predict}$ and the target value of y. The coefficient values are then adjusted using an optimization algorithm (e.g., gradient descent). The process iterates until the error or loss either no longer improves or no longer improves above a threshold amount, or a predetermined number of iterations have been performed. Following validation and testing of the model, the model may be deployed to make predictions on new, real-world data (e.g., sensor data).

b. Neural Networks

Additionally, or alternatively, the model training logic 1212 and the model evaluation logic 1217 may perform operations to train and implement a neural network configured to determine a classification and/or prediction as discussed above. As should be understood, a neural network consists of layers of interconnected nodes, or "neurons," organized into three main types of layers: input layer, hidden layers, and output layer. Each neuron in a layer is connected to neurons in the adjacent layers through weighted connections.

More specifically, the input layer receives the raw data or features (input data) relevant to the task assigned to the neural network, wherein each neuron in the input layer corresponds to a specific feature in the input data. The hidden layer(s) are intermediate layers between the input and output layers that perform complex transformations and feature extraction. Each neuron in a hidden layer takes inputs from the neurons in the previous layer, applies weights to those inputs, and passes the result through an activation function. Each connection between neurons has an associated weight that determines the strength of the connection and affects how information is propagated through the layers of the neural network. Neurons in a hidden layer apply an activation function to the weighted sum of their inputs. The activation function introduces non-linearity to the network resulting in detection of complex relationships within the input data. Examples of activation functions include ReLU (Rectified Linear Activation), sigmoid, and tanh. The output layer produces the final predictions or decisions of the neural network. The number of neurons in this layer depends on the task the neural network is assigned to solve. For example, a binary classification problem may include a single neuron with a sigmoid activation function, while a multi-class classification problem may include multiple neurons with softmax activation.

The training of a neural network involves multiple steps including a feedforward pass, computing a loss function, backpropagation, and optimization (updating weights). More specifically, the process of feeding data through the network, computing loss, performing backpropagation, and updating weights is repeated iteratively for multiple epochs (passes through the entire training dataset) until the neural network's performance converges to a satisfactory level in a similar manner as discussed above with respect to training a machine learning model.

In explaining the training process in more detail, during a feedforward pass, input (training) data is fed into the neural network. The data passes through the layers, and each neuron's weighted inputs are transformed using the activation function. The output of the output layer represents the neural network's prediction. Subsequently, the neural network's predictions are compared to the actual target values (which are known as part of the training data) using a loss function. The loss function quantifies how well the neural network's predictions match the desired outcomes. Examples of loss functions include mean squared error for regression and cross-entropy for classification. Once the loss is computed, the neural network's parameters (weights and biases) are adjusted to minimize the loss. Backpropagation is the process of computing the gradients of the loss with respect to the weights and biases, where the gradients indicate the direction and magnitude of changes needed to minimize the loss. The gradients are computed layer by layer, starting from the output layer and working backward toward the input layer using an optimization algorithm (e.g., gradient descent). For example, gradient descent causes results in a determination of an adjustment to be made for each parameters of the neural network in the opposite direction of the gradients, effectively moving the parameters towards values that reduce the loss. The weights and biases are then updated operation according to the computed gradients.

As noted above, the training process is repeated iteratively for multiple epochs (passes through the entire training dataset) until the neural network's performance converges to a satisfactory level in a similar manner as discussed above with respect to training a machine learning model. Deployment of a trained neural network comprises a feedforward pass, where input data is fed into the trained neural network. The data passes through the layers, and each neuron's weighted inputs are transformed using the activation function. The output of the output layer represents the network's prediction.

Various activation and output layer functions have been contemplated with different functions determining whether the neural network is configured to classify a current operability status or to predict a future operability status. Activation functions are used within hidden layers of a neural network to introduce non-linearity into the neural network and enable the learning of complex patterns and representations from the input data. Activation functions are applied to the weighted sum of inputs within each neuron of the hidden layers and transform the neuron's output before passing the output to the next layer. The output layer function is applied at the output layer of the neural network and is responsible for producing the final network output (e.g., classification or prediction) and also determines the format and characteristics of the output.

Examples of classification activation functions that may be utilized to generate a neural network configured to classify a current operability status may include sigmoid activation (logistic), softmax activation, rectified linear unit (ReLU), Tanh (hyperbolic tangent), swish activation, gated activation functions (e.g., long-short term memory (LSTM) or gated recurrent unit (GRU) cells), etc.

Examples of classification output functions that may be utilized to generate a neural network configured to classify a current operability status may include sigmoid activation and binary cross-entropy loss for binary classification, softmax activation and categorical cross-entropy loss (for multiclass classification), etc.

Examples of predictive activation functions that may be utilized to generate a neural network configured to predict a future operability status may include linear activation (identity function), rectified linear unit (ReLU), leaky ReLU (a variant of ReLU that allows a small, non-zero gradient for negative inputs and mitigates the "dying ReLU" problem), parametric ReLU (PReLU, which is similar to Leaky ReLU but allows the gradient to be learned during training), exponential linear unit (EPU), sigmoid activation, Tanh (hyperbolic tangent), etc.

Examples of predictive output functions that may be utilized to generate a neural network configured to predict a future operability status may include linear activation (identity function), gaussian output function, logistic sigmoid activation, hyperbolic tangent (Tanh) activation, softmax activation, exponential activation, etc. Additionally, in some embodiments, no output function may be used for predictions.

Figure 15:
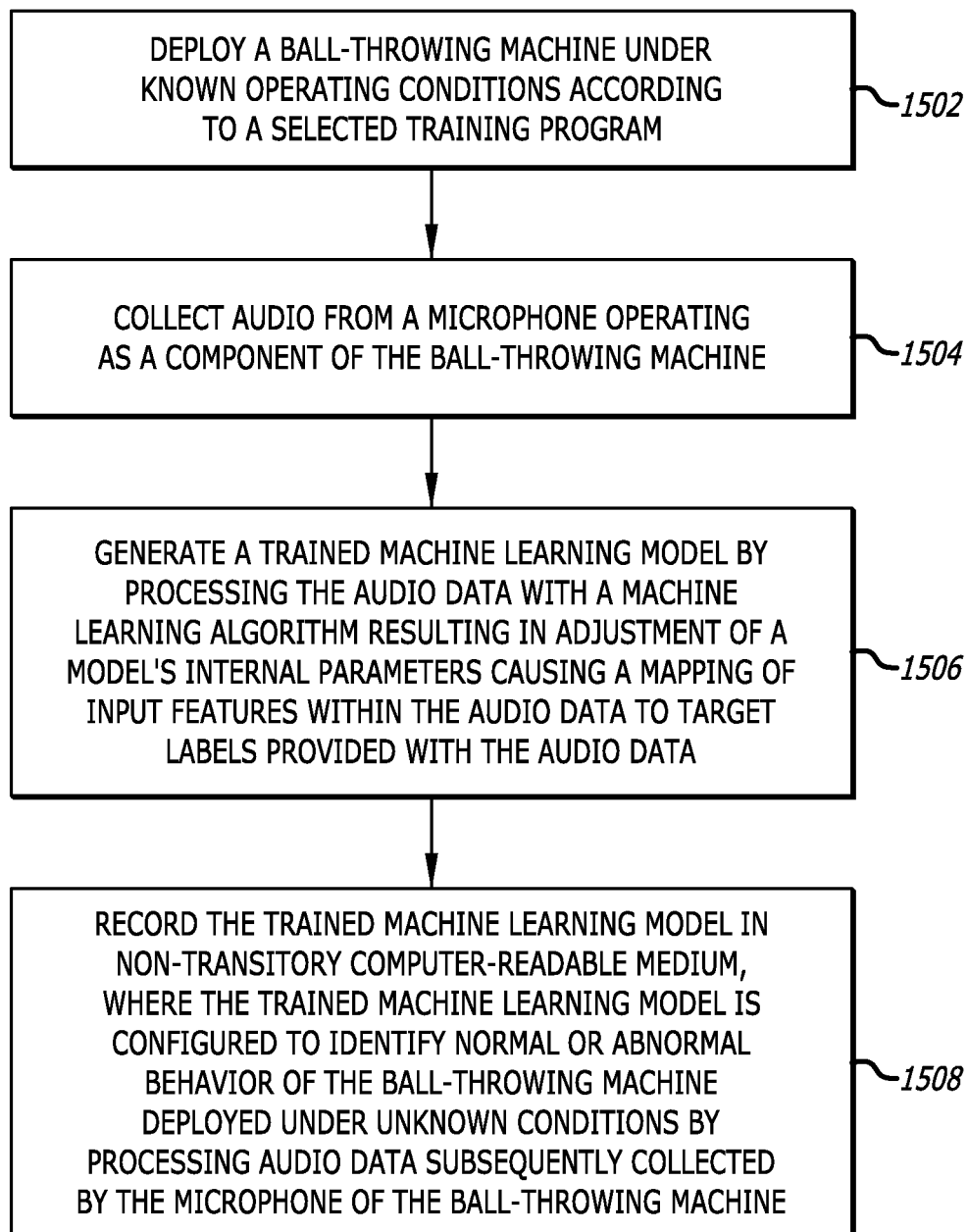
FIG. 15 is a flow diagram illustrating operations of an exemplary method for generation of a trained machine learning model configured to determine a prediction as to the operability status of a ball-throwing machine in accordance with some embodiments.

Referring now to FIG. 15, a flow diagram illustrating operations of an exemplary method for generation of a trained machine learning model configured to determine a prediction as to the operability status of a ball-throwing machine is shown in accordance with some embodiments. Each block illustrated in FIG. 15 represents an operation of the method 1500 performed by the system 1100. Additionally, some operations of the method 1500 may be optional. It should be understood that although the method 1500 specifies collection of audio data, the underlying principles for generating a trained machine learning model apply equally to other sensor data. The method 1500 begins as a ball-throwing machine is deployed under known operating conditions and according to a selected training program (block 1502).

Audio data is collected from a microphone operating as a component of the ball-throwing machine (block 1504). For example, audio data may be collected by the microphone 320 of FIG. 3, which is disposed on the control unit 220 of FIG. 3, where the control unit 220 is a component of the ball-throwing machine. Thus, the microphone, as with other sensors, should be understood as being a specific hardware component of the ball-throwing machine and configured to operate during deployment of the ball-throwing machine. Following the collection of the audio data, a trained machine learning model is generated by processing the audio data with a machine learning algorithm resulting in adjustment of the model's internal parameters causing a mapping of input features within the audio data to target labels provided with the audio data (block 1506). Thus, as part of the operations of block 1506, the audio data collected during deployment under known conditions is labeled, which may include associating a timestamp or time duration and an action title (e.g., "solenoid activation") along with the audio data. Thus, machine learning algorithm may process a set of ordered vectors of {audio data segment, action title, time stamp/time duration}, where the ordering is based on time. As a result of the ordering, the machine learning model may learn the ordering of a ball-launch sequence and the audio data comprising such. The operations of block 1506 discussing the training of a machine learning algorithm may be replaced with the training of a neural network as disclosed herein.

The trained machine learning model is then recorded in non-transitory, computer-readable medium, where the trained machine learning model is configured to identify normal or abnormal behavior (operations) of the ball-throwing machine deployed under unknown conditions by processing audio data subsequently collected by the microphone of the ball-throwing machine and/or other ball-throwing machines (block 1508).

c. Actions Responsive to Operability Determination

Figure 16:
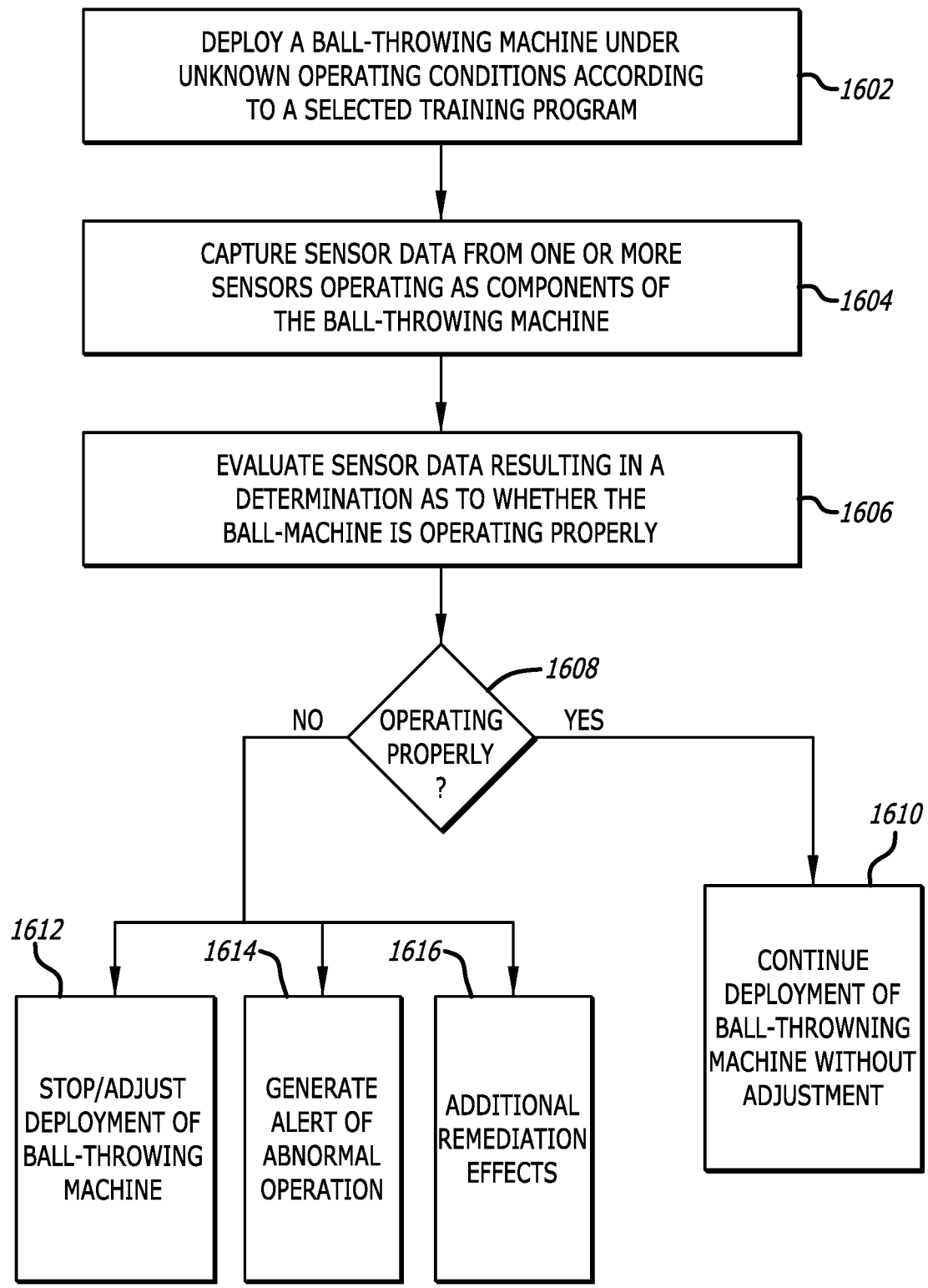
FIG. 16 is a flow diagram illustrating operations of a method for deploying a ball-throwing machine, identifying normal or anomalous behavior of the ball-throwing machine, and taking corrective action with necessary in accordance with some embodiments.

Referring now to FIG. 16, a flow diagram illustrating operations of a method for deploying a ball-throwing machine, identifying normal or anomalous behavior of the ball-throwing machine, and taking corrective action with necessary is shown in accordance with some embodiments. Each block illustrated in FIG. 16 represents an operation of the method 1600 performed by the system 1100. Additionally, some operations of the method 1600 may be optional. The method 1600 begins as a ball-throwing machine is deployed under unknown operating conditions and according to a selected training program (block 1602). As noted above, unknown operating conditions may refer to standard use without any extensive inspection of the components of the ball-throwing machine. For instance, a standard visual inspection may occur as a trainer turns on the ball-throwing machine but such would fall short of determining whether launch wheels are worn beyond glaring wear. Sensor data is collected from a one or more sensors operating as components of the ball-throwing machine (block 1604). The sensor data is evaluated in any of the manners described above (e.g., signature analysis or with machine learning techniques) resulting in a determination as to whether the ball-throwing machine (or one or more particular components thereof) are operating properly (block 1606). As noted above, the determination may be results of one or more signature comparisons and/or classifications/predictions generated by a machine learning model or neural network. When the determination indicates that the ball-throwing machine is operating properly (yes at block 1608), deployment of the ball-throwing machine continues without adjustment (block 1610). In some embodiments, a recording may be made to a data log or data store of the determination including timestamps. In some embodiments, an indication is provided to the trainer or staff member indicating proper operation such as a status indicator (e.g., light emitting diode (LED)) is illuminated in a particular color or a message or icon is provided via a text message or within a dedicated software application configured to communicate with or control the ball-throwing machine.

However, when the ball-throwing machine is not operating properly (no at block 1608), logic of the system 1100 may stop or adjust deployment of the ball-throwing machine (1612) and/or an alert or log entry may be generated and provided to a trainer or staff member (1614). In some instances, when the ball-throwing machine or certain components of the ball-throwing machine are determined to not be operating properly, the ball-throwing machine may be prevented from operating through software stored on the control unit. In other instances, a trainer may be alerted and manually select to proceed, or the default may be to proceed with standard operation until a trainer or staff member manually stops or adjusts the training program. In some embodiments, certain components may be determined to be operating improperly or abnormally at a particular percentage (e.g., 50% worn wheels), such that when the component is operating abnormally by at least a particular threshold, an alert in generated and/or the training program is prevented from proceeding or automatically adjusted. For instance, a wheel may be determined to be worn by 30% by such does not affect the safety or accuracy of the ball-throwing machine. Therefore, such may result in an alert to the trainer or a log entry generated but would not prevent the ball-throwing machine from proceeding.

In addition to the optional operations explicitly noted in blocks 1612-1614, additional remedial actions may also be performed (block 1616). Example remedial actions may vary based on the anomaly or abnormality detected. In some instances, such as when a ball in not detected at the base of the hopper (discussed above), the logic of the system 1100 may automatically obtain a second, subsequent reading from the ball-presence sensor and re-assess whether a ball is present. Additionally or alternatively, the logic of the system 1100 may pause execution of the software code corresponding to the training program for a predetermined amount of time (e.g., 5, 10, 15 seconds, etc.) in order to provide time for a ball to fall down the hopper or give a trainer or user an opportunity to place a ball in the hopper. In some instances, the logic of the system 1100 may pause the execution of the software code corresponding to the training program and activate a stepper motor or the solenoid of the ball-throwing device 100, which is intended to shake or vibrate the ball-throwing machine 100 and cause a ball to fall from a point into the hopper down to the base of the hopper.

In other instances, responsive to a determination that an object is not present at the base of the hopper, the logic of the system 1100 may ignore such a determination and assume that the ball-presence sensor is broken, faulty, or otherwise not working properly. In such instances, the logic of the system 1100 may execution of the software code corresponding to the on-going training program while monitoring whether one or more balls are launched in accordance with the training program through other methodologies (e.g., current usage via the current sensor 316 and/or the temperature sensor 318, or detecting a launch of balls through image detection of video of a user receiving balls). In other embodiments, when an abnormality or anomaly is detected (other than the lack of a ball present at the base of the hopper), any of the above remedial actions may be performed. Thus, the disclosure includes several automated actions that may be performed by the ball-throwing machine or logic thereof in response to detecting an abnormality in the operations of the ball-throwing machine 100 or component(s) comprising the same.

d. Wheel Motor Feedback

As noted above, the FIG. 2 illustrates that some implementations of the ball-throwing machine 100 include an encoder 1291 attached to the launch-wheel motor 128₁ and the discussion above indicates that a similar configuration may exist for an encoder coupled to the launch-wheel motor 128₂ (where such encoders may collectively or individually be referred to as an "encoder 129" or the "encoders 129"). The encoder 129 may comprise a Hall Effect sensor and a magnet such that the Hall effect sensor is configured to detect changes in a magnetic field as the magnet rotates with the launch-wheel motor 128. The encoder 129 is one component utilized in controlling rotation of the launch wheels 127. In some embodiments, the CCA 300 provides power to motor windings via motor drivers of the launch-wheel motors 128, where the power rotates the motor. The speed of rotation can be inferred by how much voltage and current is applied; however, this may not be highly modulated due to many variables, such as inertia, load, and friction. The encoders 129, by means of producing a discreet signal or 'blip' at specific rotation angles of the motor shaft, provide the CCA 300 information indicative of where each launch-wheel motor 128 is located in its rotation, and how fast each launch-wheel motor 128 is rotating by providing the time between blips. Based on this information, the CCA 300 may alter (e.g., add/subtract) voltage and/or current in a deliberate manner to control the position, speed, and acceleration of the launch-wheel motors 128.

Referring now to FIG. 17, a flow diagram illustrating operations of a method for monitoring wheel motor data to detect a ball launch during deployment of a ball-throwing machine is shown in accordance with some embodiments. Each block illustrated in FIG. 17 represents an operation of the method 1700 performed by the system 1100. Additionally, some operations of the method 1700 may be optional. The method 1700 begins as a ball-throwing machine is deployed according to a selected training program (block 1702). During deployment, wheel motor data is obtained through by an encoder on a wheel motor (block 1704). In some embodiments, wheel motor data is also obtained via the 'control effort' required to make the wheels spin in the desired way. Control effort is the variation of voltage or current, within some amount of time. An encoder indicates a position of the launch-wheel motor 128 at a particular time, which may be used to vary control effort. The control effort is indicative of how much energy or force is/was required to make the wheels spin in the desired way.

In many implementations, a ball-throwing machine includes two-wheel motors, each having an encoder coupled thereto. As a result, wheel motor data may be obtained for both wheel motors. In some instances, wheel motor data may refer to measured revolutions per minute (RPMs) of a wheel and a timestamp. Thus, the wheel motor data provides a recording of the speed at which a particular wheel is spinning, e.g., in revolutions per minute (RPMs), and the corresponding timing.

Logic of the system 1100 monitors the wheel motor data, which may include maintaining a log of the wheel motor data and/or comparing the wheel motor data to one or more thresholds. As discussed below, monitoring the wheel motor data may also include detecting changes in the wheel motor data and comparing the timing of the detected changes to the events (e.g., ball-launches) of the selected training program. Further, monitoring the wheel motor data may include analyzing the detected changes to determine a level of inflation of a launched ball.

In accordance with the selected training program, a ball-launch sequence is initiated by the ball-throwing machine (block 1706). As discussed above, a ball-launch sequence may be comprised of a series of actions performed by multiple components. Example actions may include adjusting the positioning of the ball-throwing machine to adjust a direction or angle of the launch, increasing or decreasing the speed of rotation of one or more wheels, and pulling a solenoid to release a ball disposed at the base of the hopper of the ball-throwing machine.

Following the ball-launch sequence, the logic of the system 1100 may determine whether the wheel motor data indicated whether a ball actually launched (block 1708). In some implementations, the logic of the system 1100 may compare the monitored wheel motor data to stored signatures of a ball-launch sequence during which a ball was properly launched. When the similarity between the monitored wheel motor data and the stored signature(s) satisfies a threshold comparison (e.g., meets or exceeds a predefined threshold level of similarity), the logic of the system 1100 determines that a ball was launched (yes at block 1708). In some instances, the logic of the system 1100 considers a timing component in such a determination. For example, the logic of the system 1100 may obtain monitored wheel data for a particular time block based on the selected training program. For example, if execution of software code corresponding to the selected training program includes initiation of a ball-launch sequence at a timestamp of Oct. 1, 2023: 17:01:00, the logic of the system 1100 may obtain monitored wheel motor data within a time block of +/−10 seconds from such a timestamp. Thus, determination of whether a ball launch occurred may include determining that a level of similarity between the monitored wheel motor data and a stored signature meets satisfies a threshold comparison and that such occurred within an expected time frame based on the execution of the software code corresponding to the selected training program. In other implementations, the logic of the system 1100 may analyze the monitored wheel data to determine whether a change in wheel spin rate within a time period corresponding to an expected ball-launch sequence.

When a ball was determined to have launched (yes at block 1708), the logic of the system 1100 may then determine an inflation level of the launched ball (block 1710). In some embodiments, an inflation level of a ball is detected based on the change in monitored wheel motor data during the ball-launch sequence. For example, the logic of the system 1100 may analyze the wheel motor data to determine whether a steep drop in RPMs occurred followed by a quick recovery back to an expected RPM level, which may indicate the ball that the launched ball was over-inflated, or whether a delayed drop in RPMs occurred followed by a prolonged recovery, which may indicate that the launched ball was under-inflated. The terms steep drop and delayed drop are used relative to each other such that an over-inflated ball will cause the RPMs of the wheels to drop quicker than an under-inflated ball. Similarly, the terms quick recovery and prolonged recovery are used relative to each other such that an over-inflated ball will cause the RPMs of the wheels to recover to an expected RPM level quicker than an under-inflated ball.

However, when a ball launch was not detected (no at block 1708), the logic of the system 1100 may perform one or more remedial actions (block 1712). Example remedial actions are discussed throughout above.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A ball-throwing machine comprising:
   one or more launch wheels configured to impart motion to one or more balls;
   a wheel motor coupled to each of the one or more launch wheels;
   a first encoder coupled to a first wheel motor coupled to a first launch wheel of the one or more launch wheels;
   a frame attached to the one or more launch wheels; and
   a control circuit configured to control the one or more launch wheels, wherein the control circuit includes a processor, and non-transitory, computer-readable medium having logic stored thereon, wherein the logic, upon execution by the processor, is configured to cause performance of operations including:
      receiving wheel motor data from the first encoder, wherein the wheel motor data includes a log of revolutions per minute of the first wheel motor, and
      detecting an inflation level of a first ball based on a variation in the wheel motor data.

2. The ball-throwing machine of claim 1, wherein imparting motion to the one or more balls includes rotating the one or more launch wheels to cause delivery of the one or more balls to a player, wherein the one or more balls are one or more soccer balls.

3. The ball-throwing machine of claim 1 further comprising:
   a second encoder coupled to a second wheel motor coupled to a second launch wheel of the one or more launch wheels, and wherein the operations further include:
      receiving wheel motor data from the second encoder, and
      detect whether the first ball was launched based on the variation in the wheel motor data received from the first encoder and the second encoder.

4. The ball-throwing machine of claim 1, wherein detecting whether the first ball was launched based on the variation in the wheel motor data includes comparing the variation in the wheel motor data to a predetermined signature of wheel motor data representing a known ball launch.

5. The ball-throwing machine of claim 1, wherein detecting whether the first ball was launched based on the variation in the wheel motor data includes processing the wheel motor data with a trained machine learning model configured to provide a classification predication indicating whether a ball launch occurred.

6. The ball-throwing machine of claim 1, wherein the operations further include:
   obtaining training wheel motor data from the first encoder collected during deployment of the ball-throwing machine under known conditions to perform the operations according to a training program;
   obtaining labels for the training wheel motor data; and
   processing the labeled training wheel motor data with a machine learning algorithm resulting in the trained machine learning model through adjustment of internal parameters of the trained machine learning model causing a mapping of the training wheel motor data to the labels.

7. The ball-throwing machine of claim 1, wherein the operations further include:
   responsive to detecting the first ball was not launched as expected, initiating a remedial action.

8. A computerized method for detecting a ball launch event performed by a ball-throwing machine that includes one or more launch wheels configured to impart motion to one or more balls and a wheel motor coupled to each of the one or more launch wheels, the computerized method comprising:

receiving wheel motor data from a first encoder coupled to a first wheel motor, wherein the first wheel motor is coupled to a first launch wheel of the one or more launch wheels, and wherein the wheel motor data includes a log of revolutions per minute of the first wheel motor; and detecting an inflation level of a first ball based on a variation in the wheel motor data.

9. The computerized method of claim 8, wherein imparting motion to the one or more balls includes rotating the one or more launch wheels to cause delivery of the one or more balls to a player, wherein the one or more balls are one or more soccer balls.

10. The computerized method of claim 8, wherein the ball-throwing machine further includes a second encoder coupled to a second wheel motor, wherein the second wheel motor is coupled to a second launch wheel of the one or more launch wheels, and further comprising:

receiving wheel motor data from the second encoder, and detect whether the first ball was launched based on the variation in the wheel motor data received from the first encoder and the second encoder.

11. The computerized method of claim 8, wherein detecting whether the first ball was launched based on the variation in the wheel motor data includes comparing the variation in the wheel motor data to a predetermined signature of wheel motor data representing a known ball launch.

12. The computerized method of claim 8, wherein detecting whether the first ball was launched based on the variation in the wheel motor data includes processing the wheel motor data with a trained machine learning model configured to provide a classification predication indicating whether a ball launch occurred.

13. The computerized method of claim 12, further comprising:

obtaining training wheel motor data from the first encoder collected during deployment of the ball-throwing machine under known conditions to perform the operations according to a training program;

obtaining labels for the training wheel motor data; and processing the labeled training wheel motor data with a machine learning algorithm resulting in the trained machine learning model through adjustment of internal parameters of the trained machine learning model causing a mapping of the training wheel motor data to the labels.

14. The computerized method of claim 8, furthering comprising:

responsive to detecting the first ball was not launched as expected, initiating a remedial action.

15. A system for detecting a ball launch event performed by a ball-throwing machine that includes one or more launch wheels configured to impart motion to one or more balls and a wheel motor coupled to each of the one or more launch wheels, the system comprising:

a processor; and non-transitory, computer-readable medium having stored thereon logic that, when executed by the processors, causes performance of operations including:

receiving wheel motor data from a first encoder coupled to a first wheel motor, wherein the first wheel motor is coupled to a first launch wheel of the one or more launch wheels, and wherein the wheel motor data includes a log of revolutions per minute of the first wheel motor; and detecting an inflation level of a first ball based on a variation in the wheel motor data.

16. The system of claim 15, wherein imparting motion to the one or more balls includes rotating the one or more launch wheels to cause delivery of the one or more balls to a player, wherein the one or more balls are one or more soccer balls.

17. The system of claim 15, wherein the ball-throwing machine further includes a second encoder coupled to a second wheel motor, wherein the second wheel motor is coupled to a second launch wheel of the one or more launch wheels, and further comprising:

receiving wheel motor data from the second encoder, and detect whether the first ball was launched based on the variation in the wheel motor data received from the first encoder and the second encoder.

18. The system of claim 15, wherein detecting whether the first ball was launched based on the variation in the wheel motor data includes comparing the variation in the wheel motor data to a predetermined signature of wheel motor data representing a known ball launch.

19. The system of claim 15, wherein detecting whether the first ball was launched based on the variation in the wheel motor data includes processing the wheel motor data with a trained machine learning model configured to provide a classification predication indicating whether a ball launch occurred, and wherein the operations further include:

obtaining training wheel motor data from the first encoder collected during deployment of the ball-throwing machine under known conditions to perform the operations according to a training program, obtaining labels for the training wheel motor data, and processing the labeled training wheel motor data with a machine learning algorithm resulting in the trained machine learning model through adjustment of internal parameters of the trained machine learning model causing a mapping of the training wheel motor data to the labels.

20. The system of claim 15, wherein the operations further include:

responsive to detecting the first ball was not launched as expected, initiating a remedial action.

21. The ball-throwing machine of claim 1, wherein detecting the inflation level of the first ball based on the variation in the wheel motor data includes detecting whether the first ball is over-inflated based on a drop in revolutions per minute (RPMs) and a recovery in the RPMs occurring over a first time as indicated by the wheel motor data.

22. The ball-throwing machine of claim 21, wherein detecting the inflation level of the first ball based on the variation in the wheel motor data includes detecting whether the first ball is under-inflated based on the drop in revolutions per minute (RPMs) and the recovery in the RPMs occurring over a second time as indicated by the wheel motor data, wherein the second time is longer than the first time.

* * * * *